United States Patent [19]
Perkins

[11] Patent Number: 5,172,217

[45] Date of Patent: Dec. 15, 1992

[54] TRANSCODER FOR SPATIAL MANIPULATION OF COMPOSITE COLOR TELEVISION SIGNALS

[76] Inventor: John Perkins, 305 E. Sherwood Dr., Cary, Ill. 60013

[21] Appl. No.: 487,417

[22] Filed: Mar. 1, 1990

[51] Int. Cl.[5] .................... H04N 11/20; H04N 9/64
[52] U.S. Cl. .................................. 358/11; 358/31
[58] Field of Search .................. 358/11, 31, 17, 22

[56] References Cited

U.S. PATENT DOCUMENTS

| | | | |
|---|---|---|---|
| 3,764,739 | 10/1973 | Faroudja | 358/330 |
| 4,037,247 | 7/1977 | Tanaka et al. | 358/11 |
| 4,266,241 | 5/1981 | Hjortzberg | 358/17 |
| 4,555,735 | 11/1985 | Usuki et al. | 358/310 |
| 4,724,476 | 2/1988 | Nakagawa et al. | 358/11 |
| 4,860,120 | 8/1989 | Yamashita | 358/330 |
| 4,956,719 | 9/1990 | Yamashita | 358/310 |

FOREIGN PATENT DOCUMENTS

| | | | |
|---|---|---|---|
| 52-2325 | 10/1977 | Japan | 358/31 |
| 1250096 | 10/1971 | United Kingdom | 358/11 |

Primary Examiner—Michael T. Razavi
Assistant Examiner—Wendy R. Greening
Attorney, Agent, or Firm—A. C. Smith

[57] ABSTRACT

The apparatus and method transforms composite video signals according to NTSC, PAL, or SECAM standards into a symmetrical form in which the chroma component is phase locked to the instantaneous horizontal frequency to provide a fixed chroma phase to horizontal position alignment of video samples for efficient spatial manipulation thereof while preserving the storage efficiency of the single signal composite video format. The horizontally phase-locked symmetrical composite video signal may be transformed back to original asymmetrical chroma-reference based phase modulation for conventional display of the video signals.

5 Claims, 23 Drawing Sheets

TRANSCODER FOR SPATIAL MANIPULATION OF COMPOSITE COLOR TELEVISION SIGNALS

BACKGROUND OF THE INVENTION

1. Field of the Invention

This invention relates to the reformatting of composite video signals into a symmetrical form which may be easily sampled and manipulated in a spatial or geometric sense, for such uses as graphic overlay, zoom, pan, windowing, etc., while still in a composite form.

Of the popular worldwide color composite video standards, National Television Standards Committee (NTSC), Phase Alternating Line (PAL), and Sequential with Memory (SECAM), each have tradeoffs and features which make them appropriate for broadcast and reception by either black & white or color television receivers. The NTSC composite color video signal, for example, is formed by taking the overall intensity (luma) portion of the subject video and adding to it a color (chroma) subcarrier signal of 3,579,545 Hertz (Fsc) which has been modulated in phase in response to color hue and in amplitude in response to color saturation. The PAL composite video standard uses a chroma subcarrier frequency of 4,433,618.75 Hertz. A portion of the unmodulated chroma subcarrier signal called "color burst" is placed on each video scan line as a chroma phase reference. The PAL composite video standard reverses the phase of this reference signal with each successive scan line. The resulting composite signal may be broadcast over a single channel and subsequently displayed on either a color television receiver by demodulating the color information, or on a black and white television receiver by displaying the entire composite video signal as if it were a black and white only video signal. It is this latter black and white compatibility requirement which gives standard composite video a characteristic non-symmetry with respect to line-to-line and field-to-field chroma reference phase, although non-linear chroma demodulators also benefit from the averaging effect of this phase irregularity.

Orthodox NTSC composite color video signals have a horizontal scan line frequency equivalent to 227.5 cycles of chroma reference (Fsc), resulting in a 180 degree phase alignment shift of the chroma reference from line to line. If an integral number of chroma reference cycles were to occur for each scan line, the chroma subcarrier peaks and valleys for a given color would align vertically and highly saturated colors would show as vertical bands on the screen of a black and white television. As it is, the 180 degree phase shift causes the alternating peaks and valleys to appear as a fine checker-board pattern which is visually more pleasing. The checker-board pattern is further blurred by forcing an additional 90 degree phase shift on each subsequent video field. Therefore, only every fourth field has the same line to reference phase relationship.

While composite video signals are a very compact and efficient format for storing, transmitting, and recording color raster video signals, the irregular relationship between scan lines and chroma subcarrier phase makes spatial manipulation of such signals very difficult and inefficient. By way of example, consider known methods of sampling a composite video signal into a field memory and subsequently playing it back to a video screen, providing a so-called "freeze-frame" capability. FIG. 1 shows such sampling within a typical such NTSC system, wherein the original chroma reference is reproduced phase-locked to the color burst signal within the composite video signal and sampling of the composite video signal occurs at three specific phase points with respect to the reproduced chroma reference, for a sampling frequency of 3 Fsc. While any sampling rate above about 2.5 Fsc may be used, an integral sampling rate allows samples to be easily repositioned spatially within the video field without loss of hue information. This is because the hue is represented as the phase difference between the chroma reference and the modulated chroma subcarrier within the composite video signal. That phase relationship extant in any given sample set ABC will be valid anywhere in any field where the same sample-to-reference phase relationship exists. The three sample values representing a particular shade of yellow, for example, will be the same values when that shade of yellow is sampled anywhere else in any field, as long as the samples are taken at the same phase points, for example the zero degree point, the 120 degree point, and the 240 degree point, with respect to the chroma reference.

FIG. 2 shows a typical layout of a field memory as it relates to the physical aspects of an NTSC video field. Individual video sample sets are stored in individual memory locations or addresses. Where spatial manipulation of the video is contemplated, the video is stored for geometric convenience as a series of independent scan lines with each line beginning at a horizontal reference point. This scheme allows for efficient location a given geometric coordinate as a particular row (scan line) and column (sample set) within the field memory. The horizontal reference point is set at the first sample set after horizontal sync is detected in the video. FIG. 2 also shows an expanded view of a small portion of the video field with associated memory addresses aligned as necessary to sample sets. The expanded view shows a segment of three scan lines. As graphically depicted, address 206 contains the sample set for scan line 2 (the vertical address component 2xx), sample set 6 (the horizontal address component x06). Similarly, addresses 305 and 306 contain samples sets 5 and 6 respectively for scan line 3, and address 406 contains sample set 6, line 4. The staggered alignment of the addresses between scan lines illustrates the actual location of the samples sets with respect to the rectangular raster of the displayed video field. As discussed above, this stagger is caused by phase-synchronous sampling relative to the chroma reference which reverses phase on each successive scan line.

FIG. 3 shows a larger portion of the subject field memory in the vicinity of the horizontal reference, with the impact of the horizontal reference on the memory addressing. Horizontal address components are shown in hexidecimal numbering. Also shown is the position of an example vertical video detail (such as a telephone pole) in the video field. Video values representing the vertical detail would be sampled in the sample set and individual sample which intersect the vertical detail. As shown in FIG. 3, the vertical detail would be reflected in: line 2, sample set 3, (or address 203) sample C; line 3, sample set 3, (or address 303) sample A; line 4, sample set 3, (or address 403) sample C; line 5, sample set 3, (or address 503) sample A; line 6, sample set 3, (or address 603) sample C; and line 7, sample set 3, (or address 703) sample A. A "window" surrounding the vertical detail, including addresses 202, 203, 204, 302, 303, 304, 402, 403, 404, 502, 503, 504, 602, 603, 604, 702, 703, 704, etc. is defined for an example of spatial manipulation.

The above discussions have related to orthodox NTSC composite video sometimes referred to as "studio quality" NTSC composite video because the horizontal line frequency is scrupulously maintained at 2 Fsc divided by 455. However, with video sources such as consumer video cassette recorders (VCRs) and video disk players, where horizontal frequency is affected by small irregularities in drive motor speed, the phase relationship between the chroma reference and the scan lines will also reflect these irregularities. The result is unorthodox NTSC composite video, sometimes referred to as having time-base error. FIG. 4 shows the example of FIG. 3, but with time-base error illustrated by the irregular line-to-line phase pattern. The phase irregularities cause the vertical detail to occur in different samples than with a regular phase relationship. In the example shown in FIG. 4, the vertical detail would be stored in: address 203, sample C; address 204, sample A; address 303, sample A; address 403, sample C; address 503, samples B and C; address 603, sample A; and address 703, sample B.

Turning now to spatial manipulation of the video field as reason for storing the video samples in a field memory, suppose that it is desirable to move the previously defined video window surrounding the vertical detail up one scan line as a video effect. The most efficient method by which to accomplish this movement is to effectively move the samples within the field memory up one logical scan line. Physically this can be accomplished by either actually moving the sample sets within the memory storage area or by manipulating the memory addressing within the windowed address space. FIG. 5 and FIG. 6 show the result of moving the vertical detail in FIG. 3 and FIG. 4 respectively, up one scan line. Since the like numbered sample sets of the next line up occupy different absolute horizontal positions within the video field, the vertical detail, while up one scan line, is no longer a purely vertical detail but rather jagged in appearance. The color of the vertical detail will be correct because the samples are in proper phase with respect to the chroma reference. With the "studio quality" composite video of FIG. 3, moving the window up one more scan line would return the sampling alignment to that of its original alignment two lines below because phase alignment is the same for every other scan line within a video field. However, with the time-base irregularities of FIG. 4, there is no guaranteed other scan line set which repeats the phase alignment of any other given scan line set, resulting in a potentially jagged video detail no matter to which other line the window is moved. Also, with the 90 degree phase shift of the chroma reference between adjacent video fields, any such moving of the video window to another such adjacent video field, even moving to the same scan line, will result in horizontally shifted video detail regardless of whether the composite video is of "studio quality" or not.

The prior art of video spatial manipulation has resolved the problem of jagged video detail by abandoning composite video as the medium for storage and manipulation, in favor of so-called "component" video. The process involves decoding the composite video into, for example, luma (Y) and chroma (R-Y, B-Y) components or primary color (R, G, & B) components, storing and manipulating the video in this form, and then encoding the components back into composite video for final output to a television receiver or monitor. In this component form, the video hue is no longer phase encoded and therefore, may be aligned horizontally in an absolute sense and manipulated freely without regard to phase-induced positional anomalies or loss of color integrity. However, this solution is inefficient with respect to video storage since the signals representing each of the components must be stored and manipulated as separate variables.

SUMMARY OF THE INVENTION

In accordance with the apparatus and method of the present invention, composite video is transformed into a symmetrical form in which the chroma is phase-locked to the instantaneous horizontal frequency, thus providing the fixed phase to horizontal position alignment needed for efficient spatial manipulation, while preserving the storage efficiency of the single signal composite video format. The even chroma phase alignment resulting from the present invention, allows the vertical detail to be stored in aligned orientation for each scan line of which it is a part. With the chroma subcarrier frequency as a direct integral multiple of horizontal frequency and phase-locked to that frequency, this alignment is maintained whether the original composite video is of "studio quality" or has horizontal irregularities. Any irregularities will be matched by equivalent irregularities in the chroma phase, yielding a net line-to-line alignment variance of zero. Thus, moving the window up one line, or any number of lines, as shown in FIG. 8, maintains the vertical feature of the subject video without jagged artifacts To display the resulting video, the transformed, horizontally phase-locked symmetrical composite video must be transformed back to its original asymmetrical chroma reference based phase modulation. This section transformation is also an object of the present invention.

DESCRIPTION OF THE DRAWINGS

FIGS. 17(a)-(g) are schematic and graphical illustrations of the circuitry and operating waveforms for producing controlling signals according to the present invention.

DESCRIPTION OF THE PREFERRED EMBODIMENT

Figure 1:
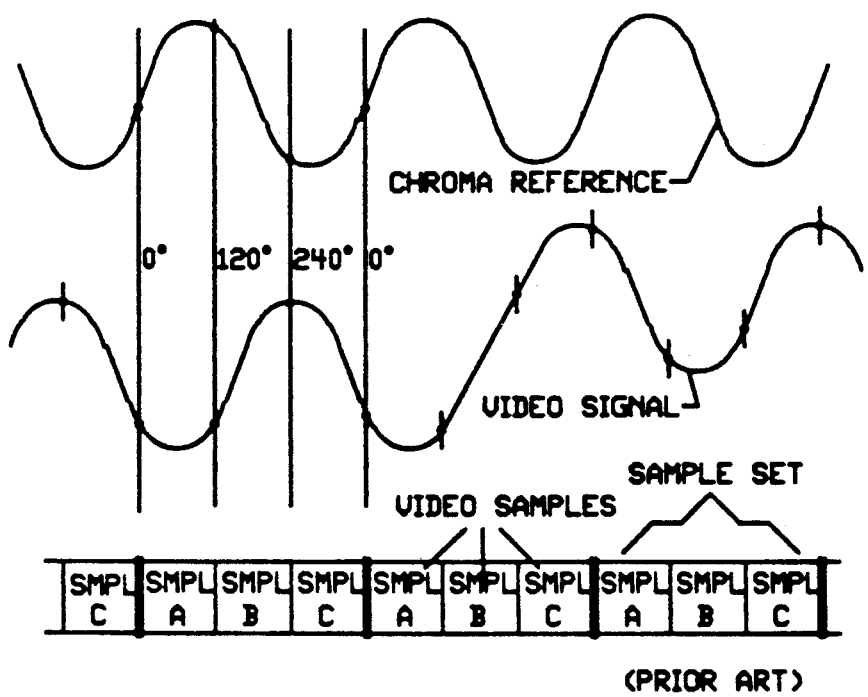
FIG. 1 is a graph illustrating the sampling of composite video signal according to conventional NTSC standards.
Figure 2:
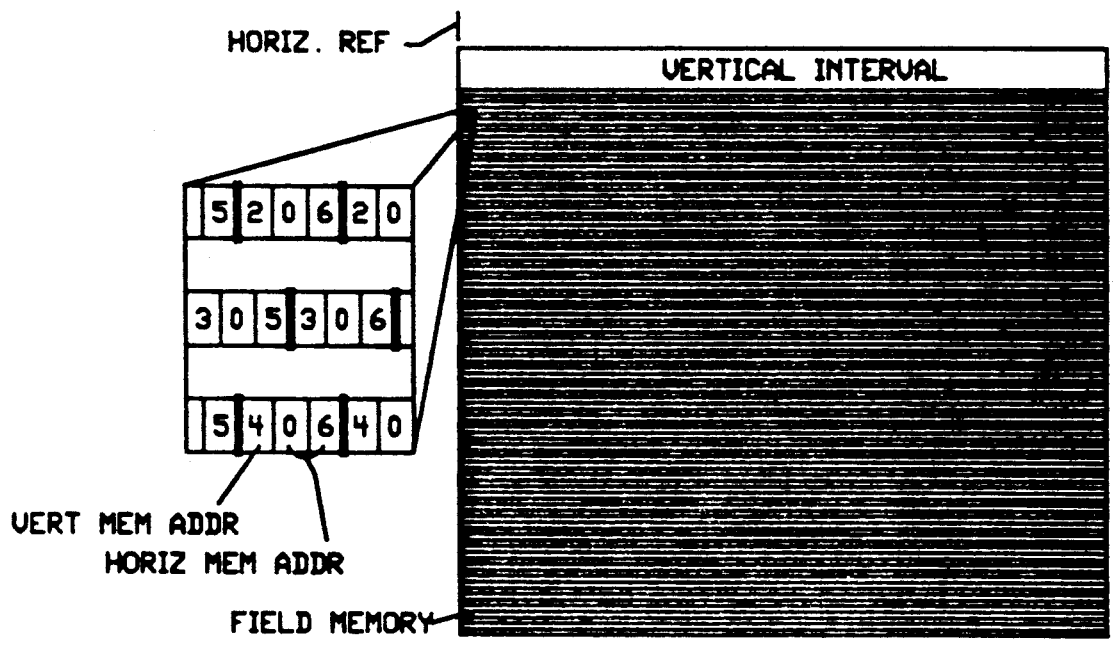
FIG. 2 is a pictorial representation of the physical aspects of a typical layout of a field memory according to the NTSC standards.
Figure 3:
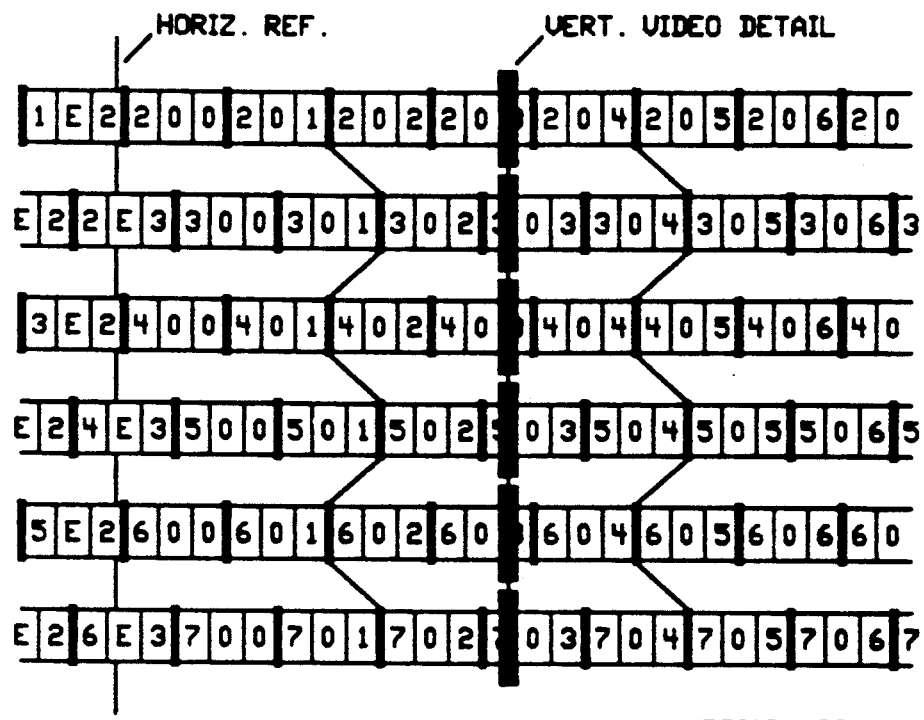
FIG. 3 is an expanded representation of field memory samples in the vicinity of a horizontal reference according to the NTSC standards.
Figure 4:
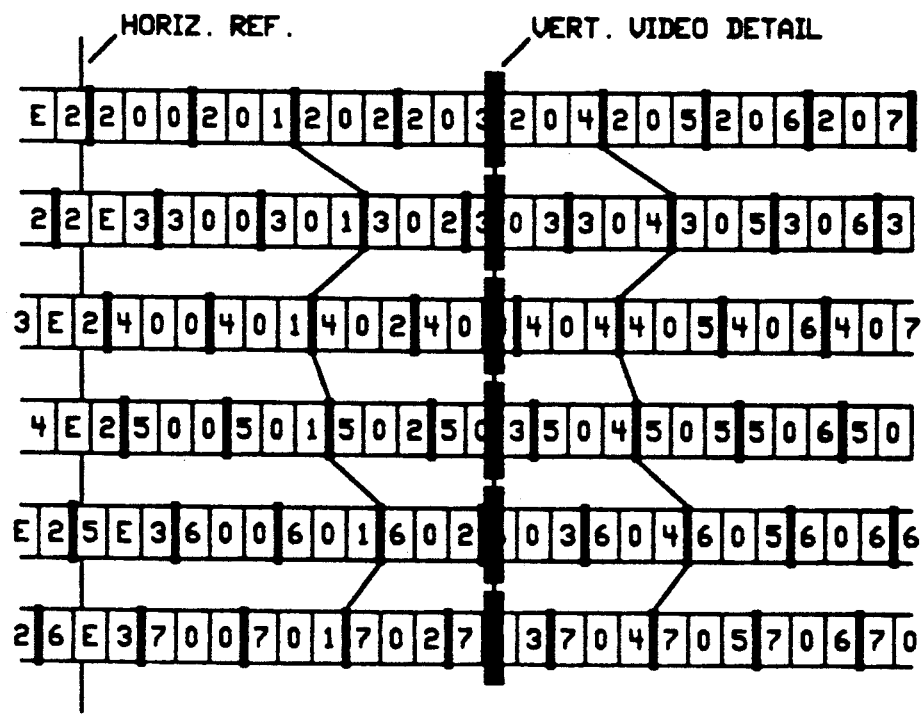
FIG. 4 is an expanded representation of field memory samples according to FIG. 3 with time-base error manifested as irregular line-to-line phase pattern.
Figure 5:
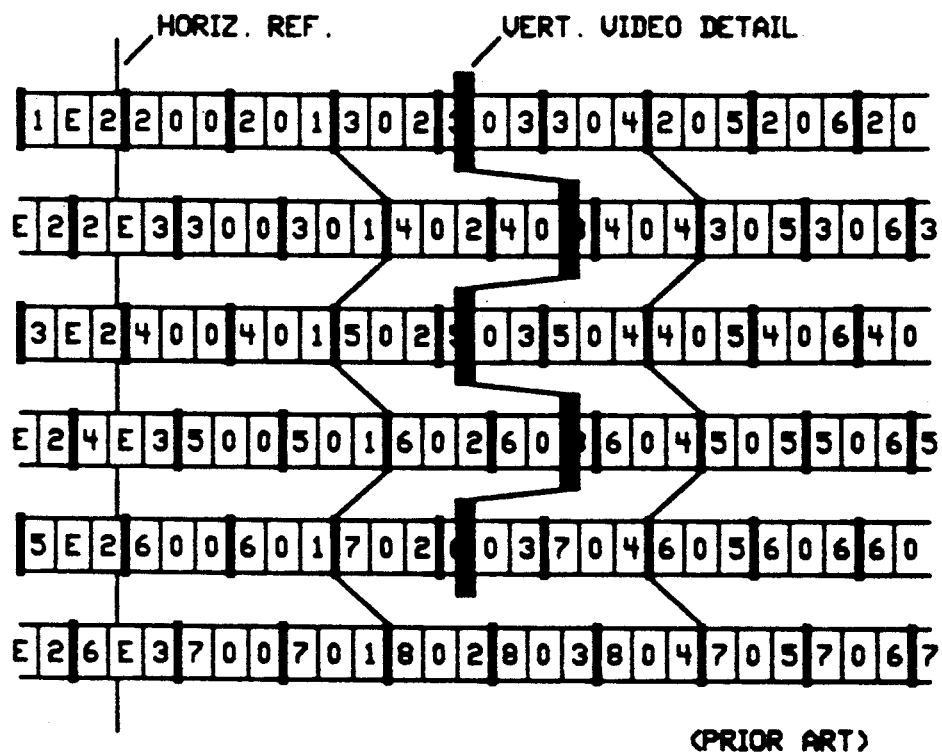
FIGS. 5 and 6 are expanded representations of field memory samples illustrating the vertical details according to FIGS. 3 and 4, respectively, moved up one scan line.
Figure 6:
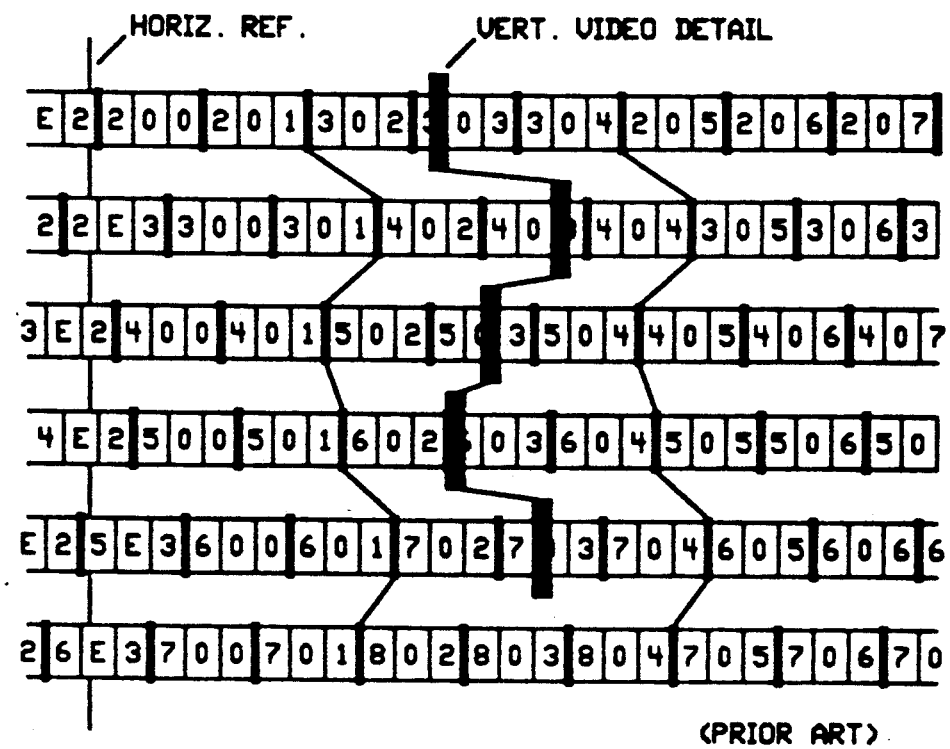
Figure 7:
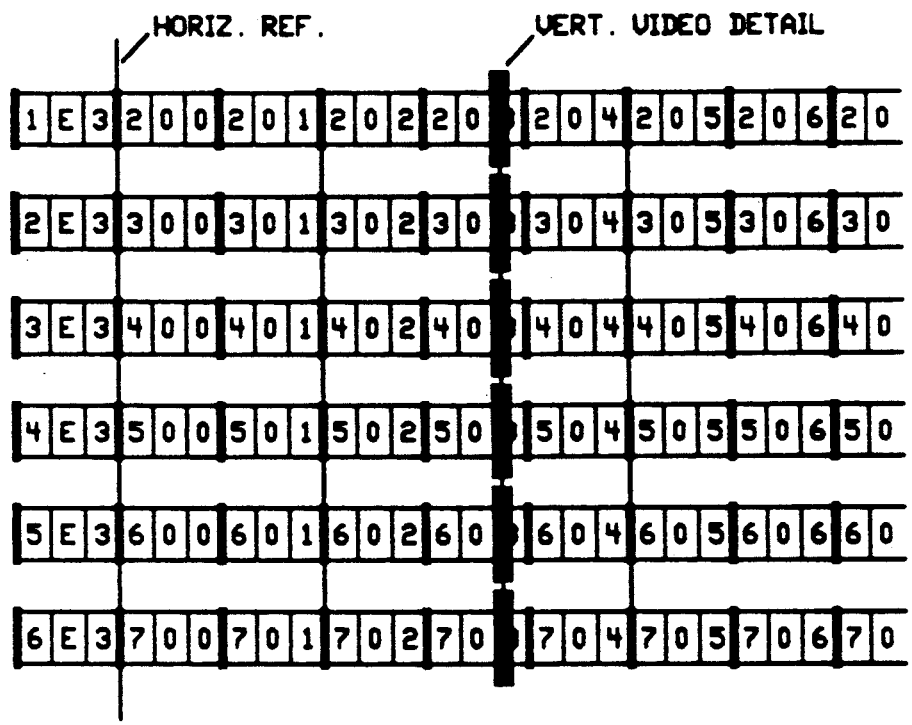
FIGS. 7 and 8 are expanded representations of field memory samples with even chroma phase alignment even with vertical details moved up one scan line in accordance with the present invention; ,/
Figure 8:
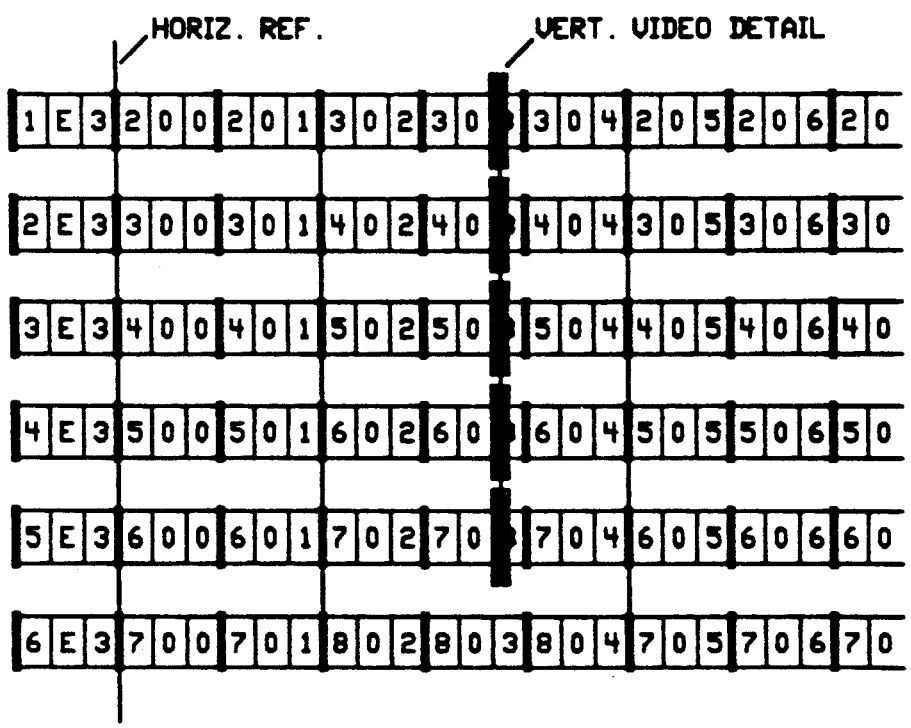
Figure 9:
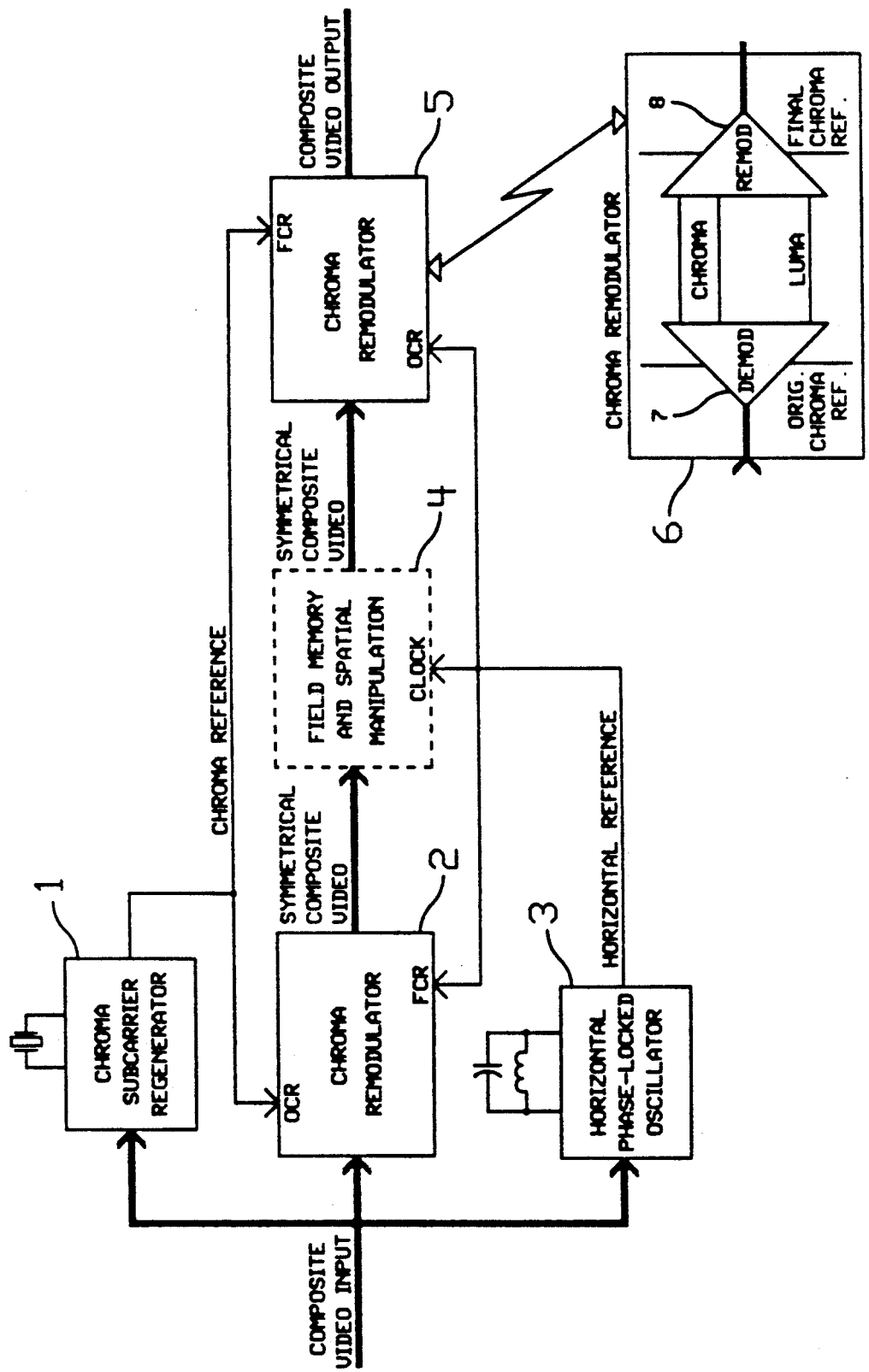
FIG. 9/ is a block schematic diagram of one circuit embodiment of the present invention for spatial manipulation of video samples.

Referring now to FIG. 9, there is shown a schematic diagram of a system for video spatial manipulation incorporating the present invention described as a pair of chroma remodulators, 3 and 5. The inset 6 shows a block diagram of the chroma remodulators as consisting of a demodulation stage 7 and a remodulation stage 8. Following from the left side of FIG. 9, standard composite video, such as NTSC composite video, enters the system where it is used by a chroma reference regenerator 1 to regenerate the chroma reference signal phase-locked to the color burst signal within the composite video signal, in conventional manner. It is also used by a horizontal phase-locked oscillator 3 to phase-lock the oscillator to the horizontal synchronization pulses within the composite video signal in conventional manner. The frequency of the horizontal phase-locked oscillator 3 is set to operate at a frequency which is an integral multiple of the horizontal frequency and which is slightly higher than the chroma reference frequency.

As the composite video signal enters the first chroma remodulator 2 the chroma is demodulated by the demodulator 7 using the original (chroma) reference signal as the demodulation reference. At this point the video signal is divided into its luma component and two or more chroma components where hue is no longer phase encoded with respect to the original chroma reference. Typical formats for these chroma components are Xc and Yc, I and Q or R-Y and B-Y. The luma signal and chroma signals pass into the remodulator 8 where the final (horizontal) reference signal is modulated in amplitude in response to color saturation and in phase in response to color hue, and then added to the luma signal to form a single symmetrical composite video signal. This symmetrical composite video is the same as the original composite video signal except that the chroma portion of the signal is now phase referenced to the horizontal reference signal as opposed to the chroma reference signal as was the case in the original composite video signal. The symmetrical composite video signal may be sampled at any 3rd or higher multiple the horizontal reference frequency, stored in a field memory 4 and manipulated spatially 4 by simple addressing schemes using the horizontal reference frequency for positional units, without concern for video detail or color distortions.

Having been spatially manipulated, the symmetrical composite video enters a second chroma remodulator 5 where the transformation affected by the first chroma remodulator 3 is reversed. Again the chroma is demodulated by the demodulator 7, but this time using the original (horizontal) reference signal as the demodulation reference. Again the video signal is divided into its luma component and chroma components where hue is no longer phase encoded with respect to the original horizontal reference. The luma signal and chroma signals pass into the remodulator 8 where the final (chroma) reference signal is modulated in amplitude in response to color saturation and in phase in response to color hue, and then added to the luma signal to form a single composite video signal of the format of the original composite video signal.

Figure 10A:
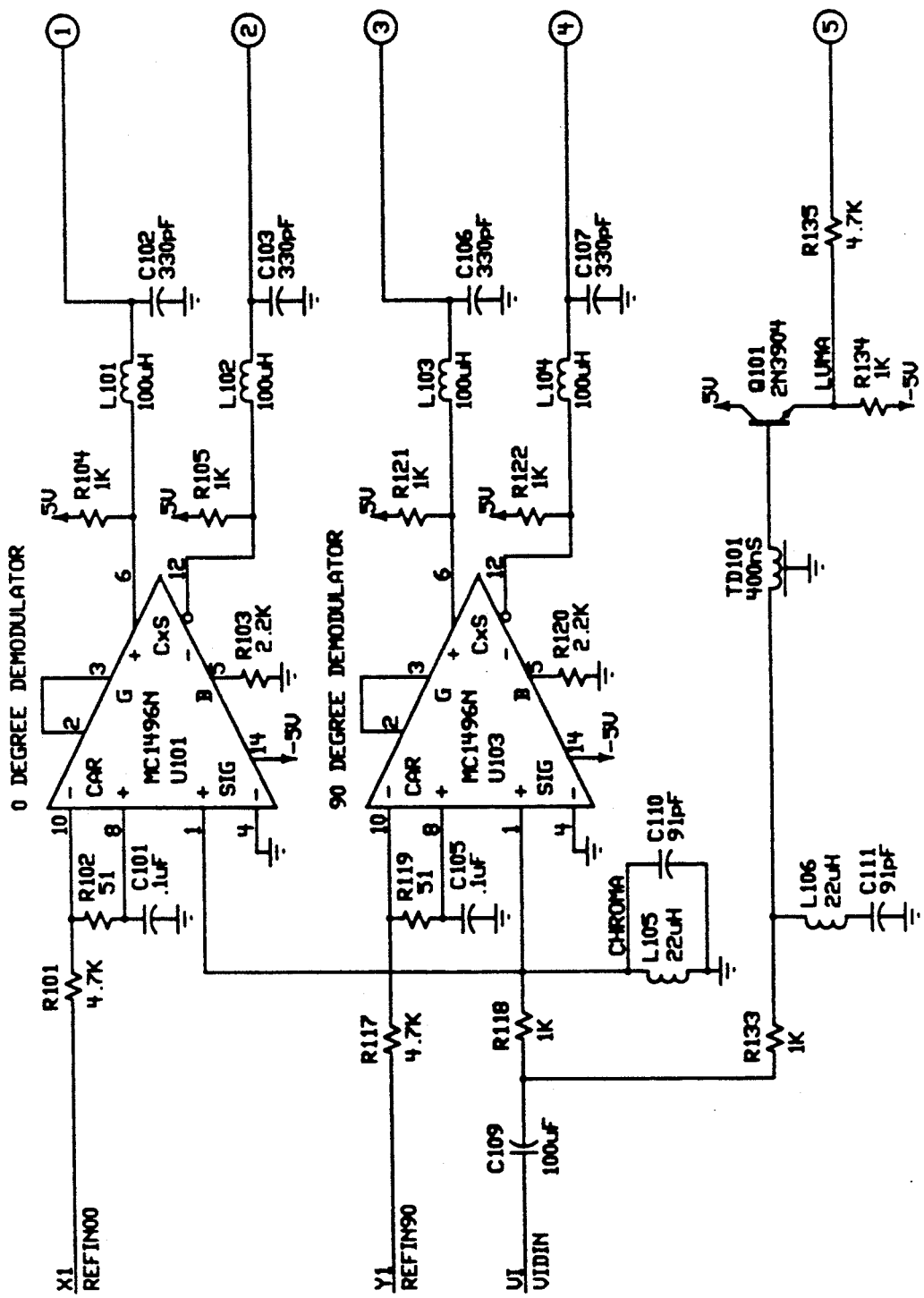
FIGS. 10a–10b are a schematic diagram of a chroma remodulator according to the present invention.
Figure 10B:
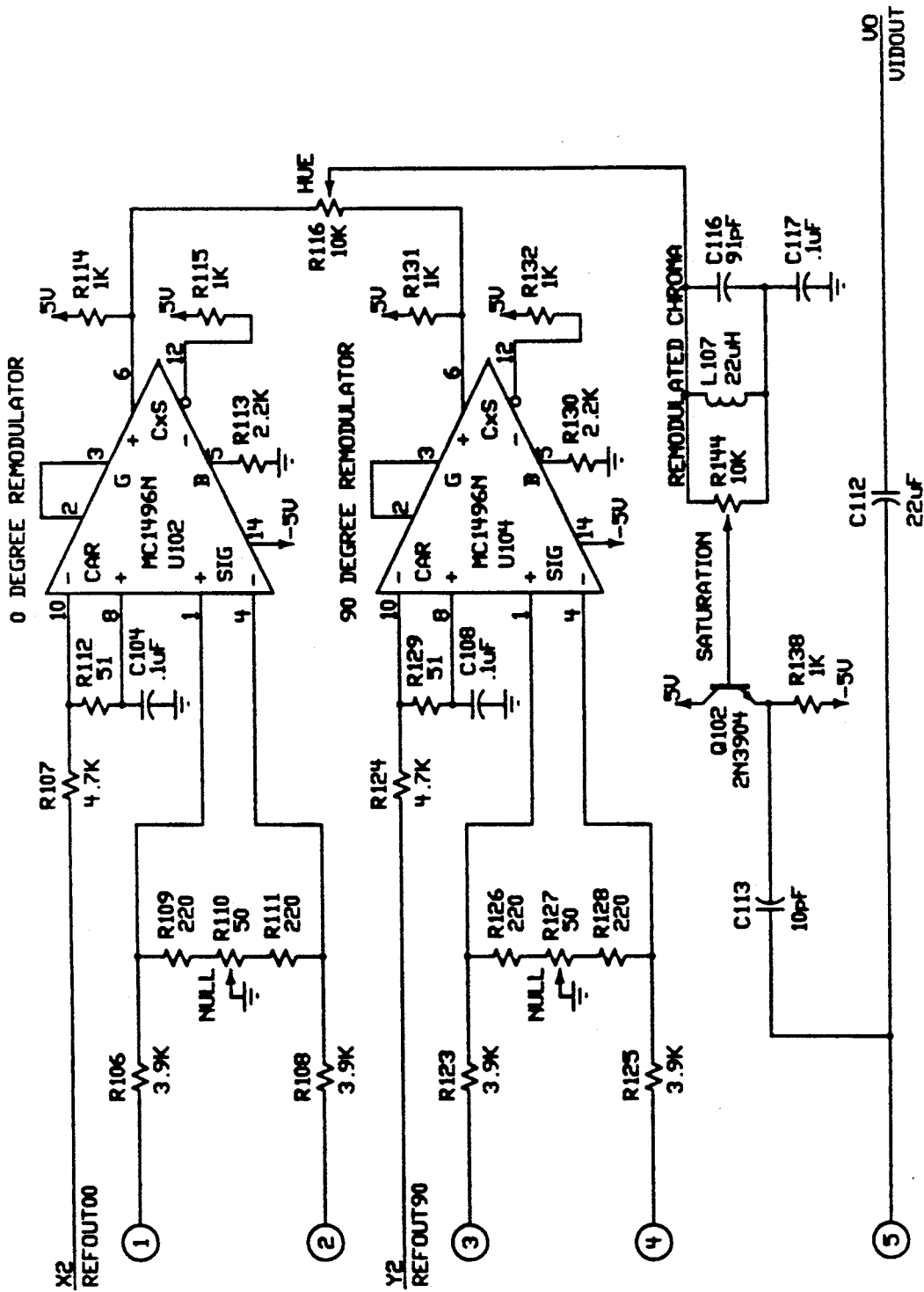

Referring now to the schematic of FIG. 10, there is shown one embodiment of the chroma remodulator which is the object of the present invention, implemented with standard components using analog/linear technology. The composite video signal enters the circuit at the left side at the point marked VI VIDIN. The original and final reference signals are marked X1, Y1 and X2, Y2, respectively. The X1 and X2 signals are assumed to be in phase with their respective reference signals while signals Y1 and Y2 are assumed to lead their respective reference signals in phase by 90 degrees. The remodulated composite video signal leaves the circuit at the right side at the point marked VO VIDOUT. Chroma and luma portions of the incoming composite video signal VI VIDIN are separated by two filter circuits. L105 and C110 form a band-pass filter for the chroma frequency and remove the lower frequency luma component. L106 and C111 form a band-gap filter which suppresses the chroma component and allows luma to pass.

This circuit includes four modulator/demodulators U101 U102 U103 U104 such as the MC1496N made by Motorola. U101 is used to demodulate chroma in phase with the original reference signal X1 while U103 demodulates chroma referenced to a signal 90 degrees ahead of the original reference signal Y1. The resultant levels at R106, R108, R123, and R125 are equivalent to Xc, -Xc, Yc, and -Yc respectively. The hue and saturation defined by Xc and Yc may be determined by the formulae:

$$\text{saturation} = (Xc^2 + Yc^2)^{\frac{1}{2}} \quad \text{hue} = \arctan(Xc/Yc) \quad \text{(Eq. 1)}$$

Xc and -Xc are fed into U102 along with X2 for remodulation of Xc in phase with the final reference signal X2. Similarly, Yc and -Yc are fed into U104 along with signal Y2 for remodulation of Yc in phase with the final reference signal Y2. Potentiometers R110 and R127 are used to cancel out any DC bias which may be present in Xc, -Xc and Yc, -Yc respectively. R116 sums the remodulated forms of Xc and Yc in a ratio which is based on the adjustment setting of R116. This adjustment compensates for differences in DC bias in the remodulators, although as a by-product its effect is to adjust the coefficients of Xc and Yc as they are summed and thus the hue bias of the summing process. L107 C116 form a band-pass filter for the final chroma reference frequency to remove the frequency sum and frequency difference components which are a consequence of the summing process. The result at R144 is remodulated chroma and the setting of R144 is used to adjust for the increase of chroma amplitude, or saturation, which resulted from the remodulation process.

Q102 provides current gain for the remodulated chroma signal prior to being recombined with luma signal.

The luma signal which was separated from the original composite video signal is delayed 400 nanoseconds by TD101 and provided with a current gain by Q101. The delay is necessary to compensate for the time delay of the chroma signal during the demodulation/remodulation process. Luma and remodulated chroma are recombined by summing at the junction of R135 C113 to provide the remodulated composite video output VO VIDOUT.

Figure 11A:
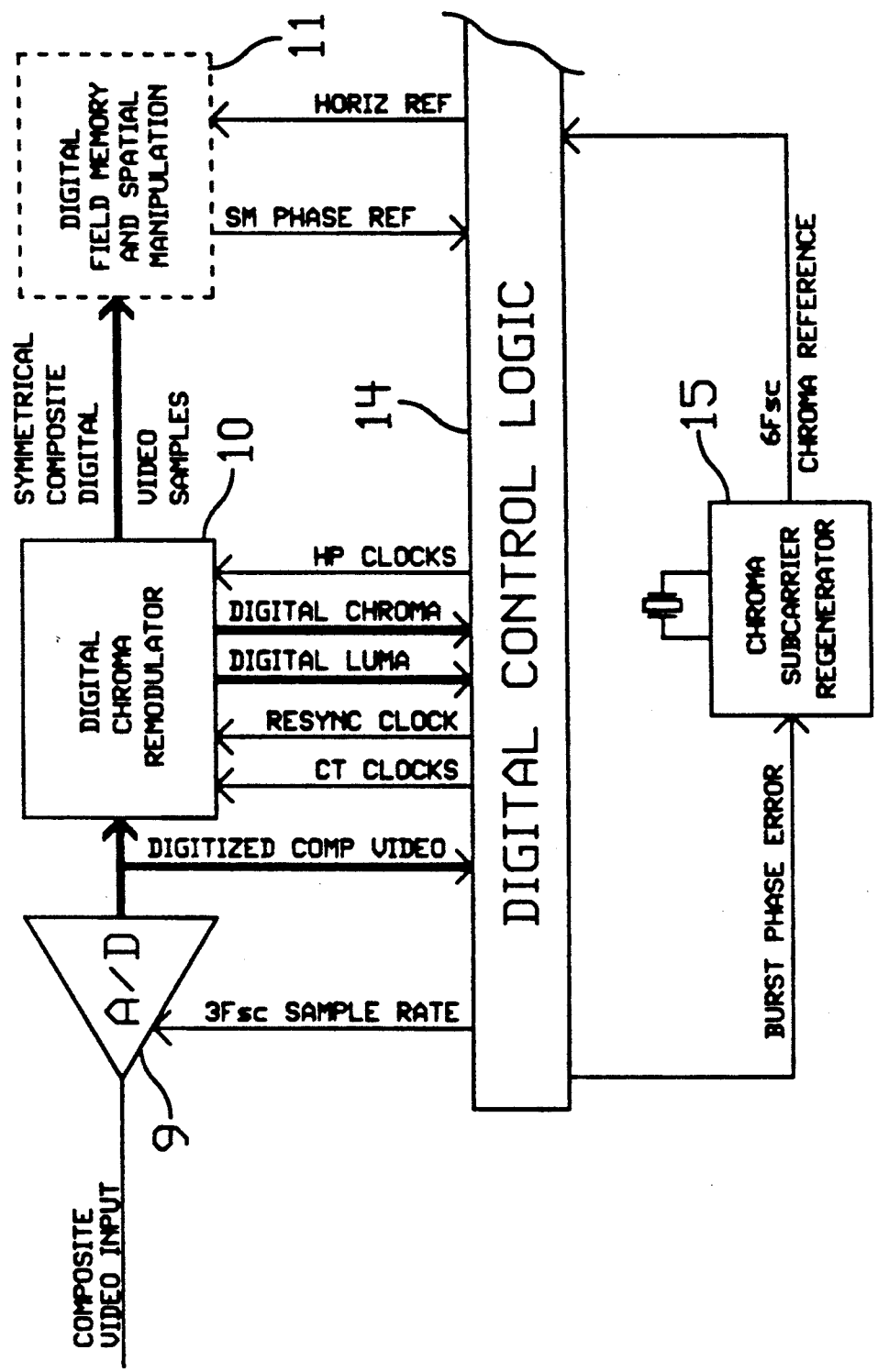
FIGS. 11a–11b are a block diagrams of a digital system for spatially manipulating composite video.
Figure 11B:
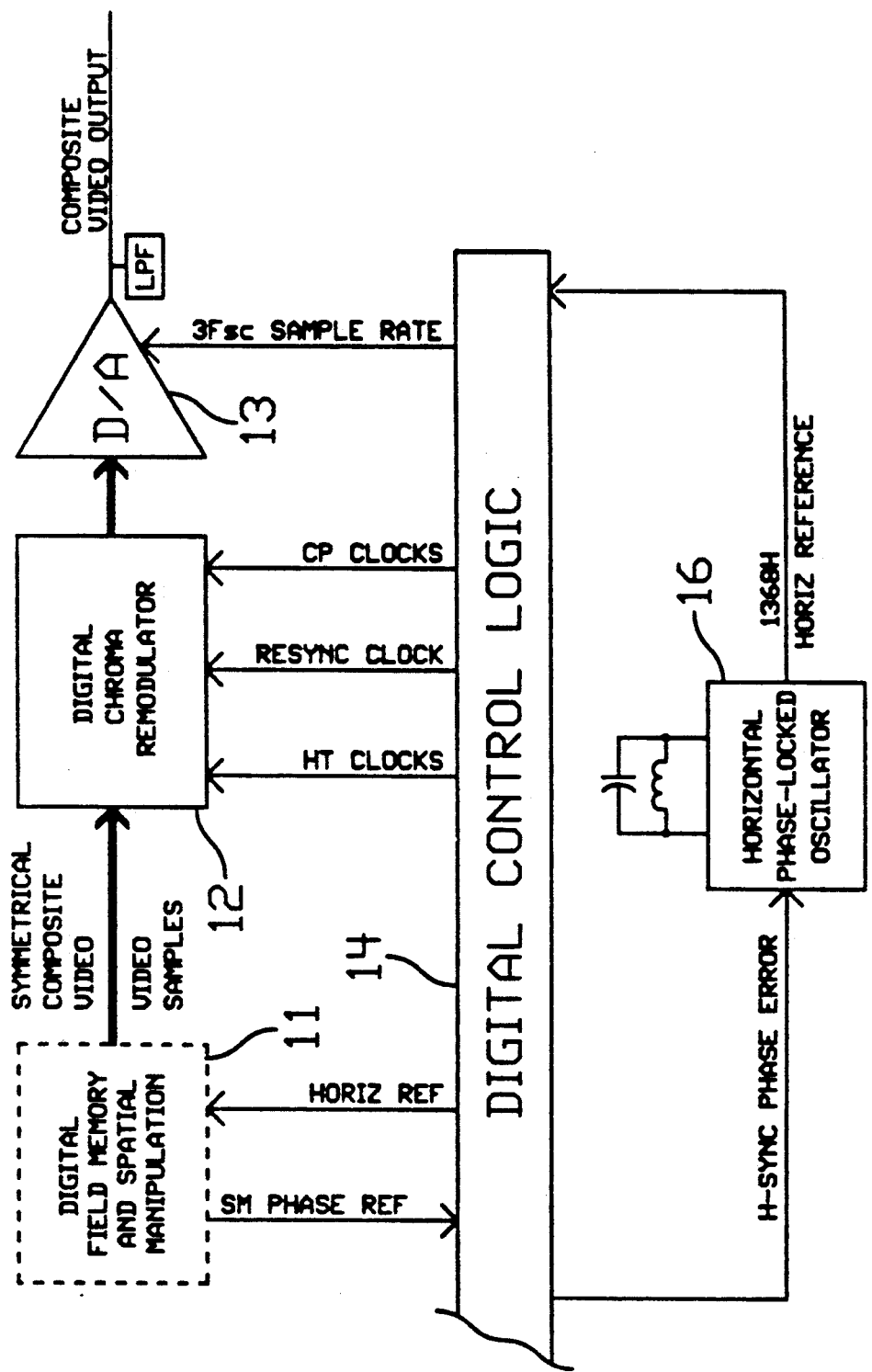
Figure 12A:
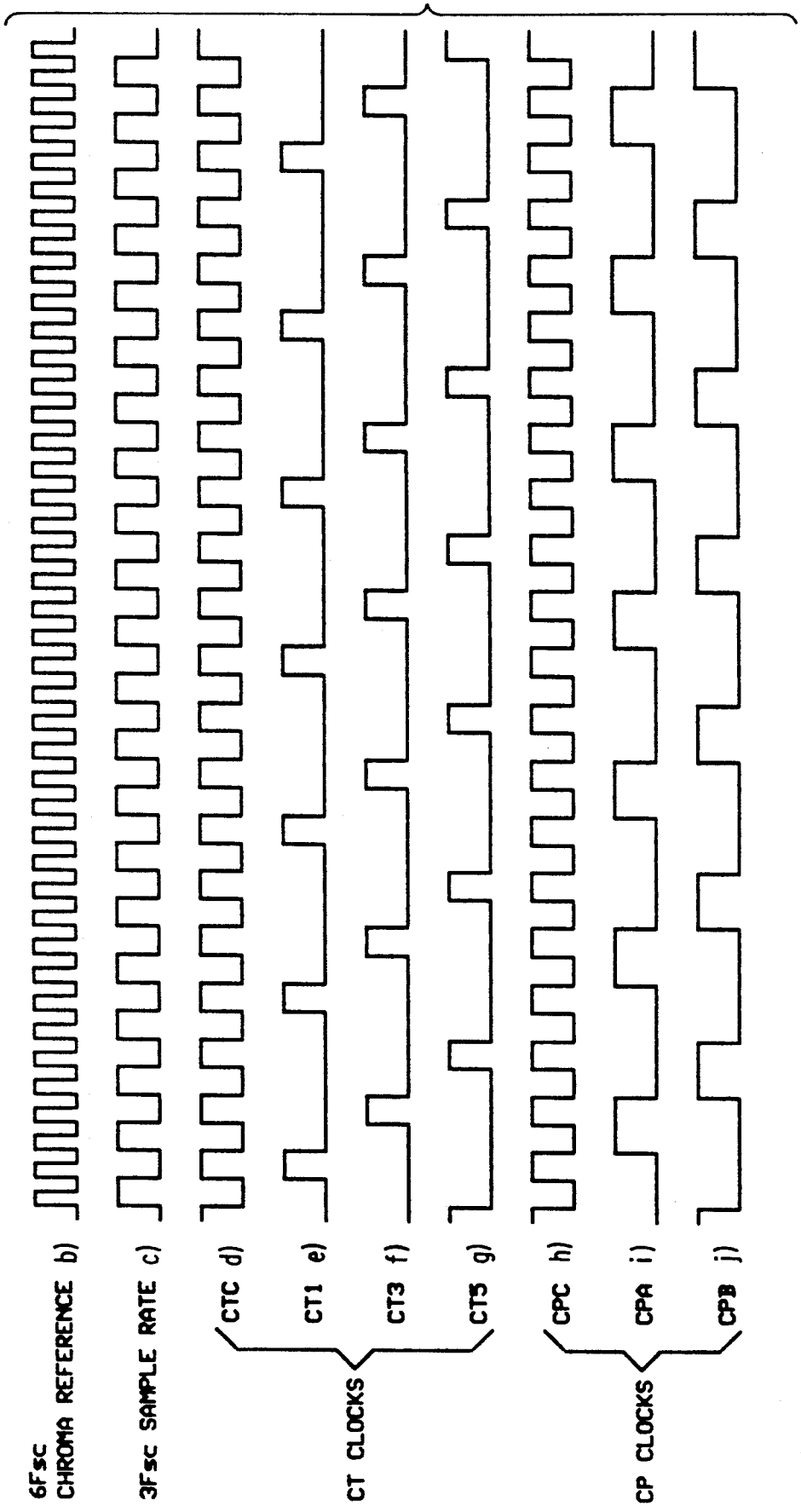
FIGS. 12a–12b are a graphs illustrating timing signals in the operation of the present invention.
Figure 12K:
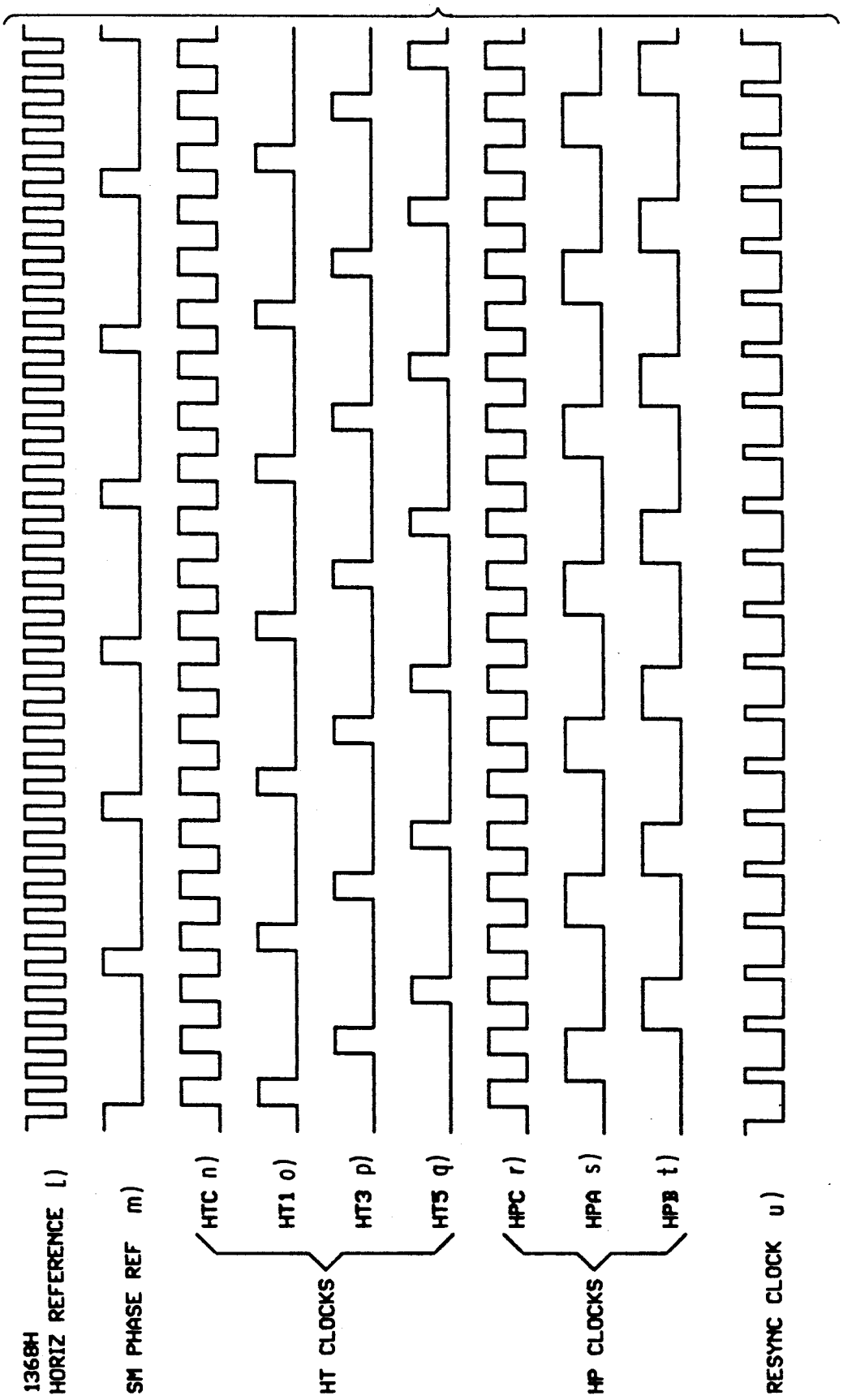

The illustrated embodiment of the present invention remodulates chroma by digital means, thereby circumventing concern for analog component variations or adjustments. FIG. 11 shows a block diagram of a digital system for spatial manipulation of composite video incorporating the present invention described as a pair of digital chroma remodulators 10 and 12. A standard analog composite video signal enters the circuit of FIG. 11 at the left side and passes immediately into an analog-to-digital (A/D) converter 9 where it is sampled at a frequency of 3 Fsc and converted into a digital sample stream in conventional manner. The signal remains as a stream of digital samples throughout the process until it is reconverted to analog form by a digital-to-analog (D/A) converter 13 with low-pass filter LPF, of conventional types, and leaves the circuit of FIG. 11 on the right side as a standard analog composite video signal. Digital control logic 14 accepts as input, CHROMA REFERENCE, a 6 Fsc multiple of the original chroma reference frequency from the chroma subcarrier regenerator 15, HORIZ REFERENCE, a 1368H multiple of the horizontal scan line frequency from the horizontal phase-locked oscillator 16, and SM PHASE REF, a spatial manipulator phase reference from the field store and spatial manipulator 11, and creates the timing signals, as shown in FIG. 12, which are used for 3 Fsc sampling and control of the digital chroma remodulators 10 and 12.

As the composite video sample stream enters the first chroma remodulator 10 the chroma is demodulated using CT CLOCKS derived from the original (chroma) reference signal as the demodulation reference. At this point the video samples are divided into separate luma and chroma samples. The luma and chroma samples are then time-aligned to the final (horizontal) reference using RESYNC CLOCK and HP CLOCKS where the final (horizontal) reference samples are recombined to form a single stream of symmetrical composite video samples. This symmetrical composite video sample stream is the same as the original composite video sample stream except that the chroma portion of the signal is now referenced to the horizontal reference signal as opposed the chroma reference signal as was the case in the original composite video sample stream. The symmetrical composite video sample stream may be stored in a field memory 11 and manipulated spatially 11 by simple addressing schemes using the horizontal reference frequency for positional units, without concern for video detail integrity or color distortions.

Having been spatially manipulated, the symmetrical composite video sample stream enters a second chroma remodulator 12 where the transformation affected by the first chroma remodulator 10 is reversed. Again the chroma is demodulated, but this time using the original (horizontal) reference HT CLOCKS as the demodulation reference. Again the video samples are divided into luma and chroma samples, time-aligned to the final (chroma) reference using RESYNC CLOCK and CP CLOCKS, and recombined to form a single stream of original chroma referenced (asymmetrical) composite video samples.

Figure 13A:
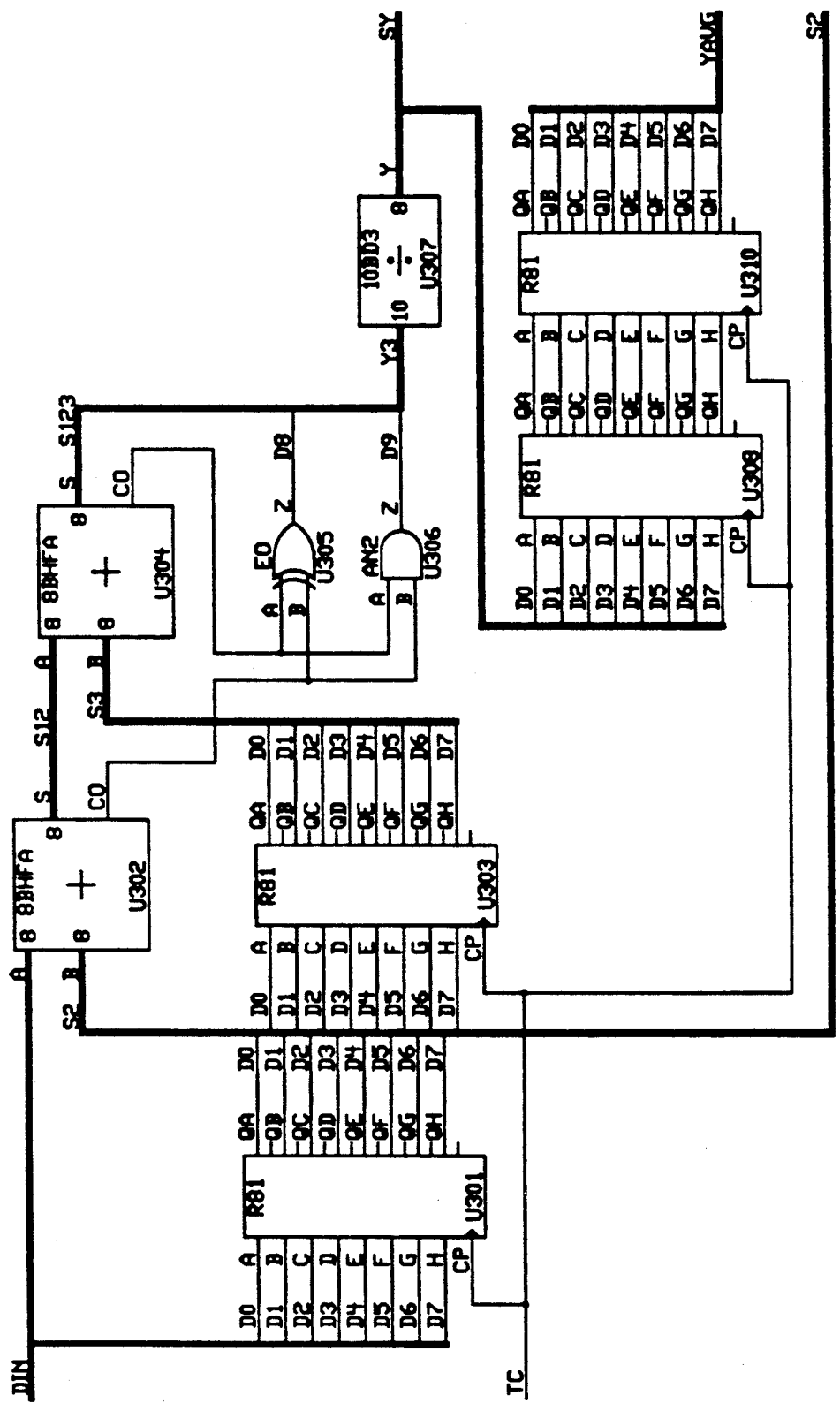
FIGS. 13a-13b are a schematic diagram of one embodiment of the demodulator stage of the digital chroma remodulators according to the present invention.
Figure 13B:
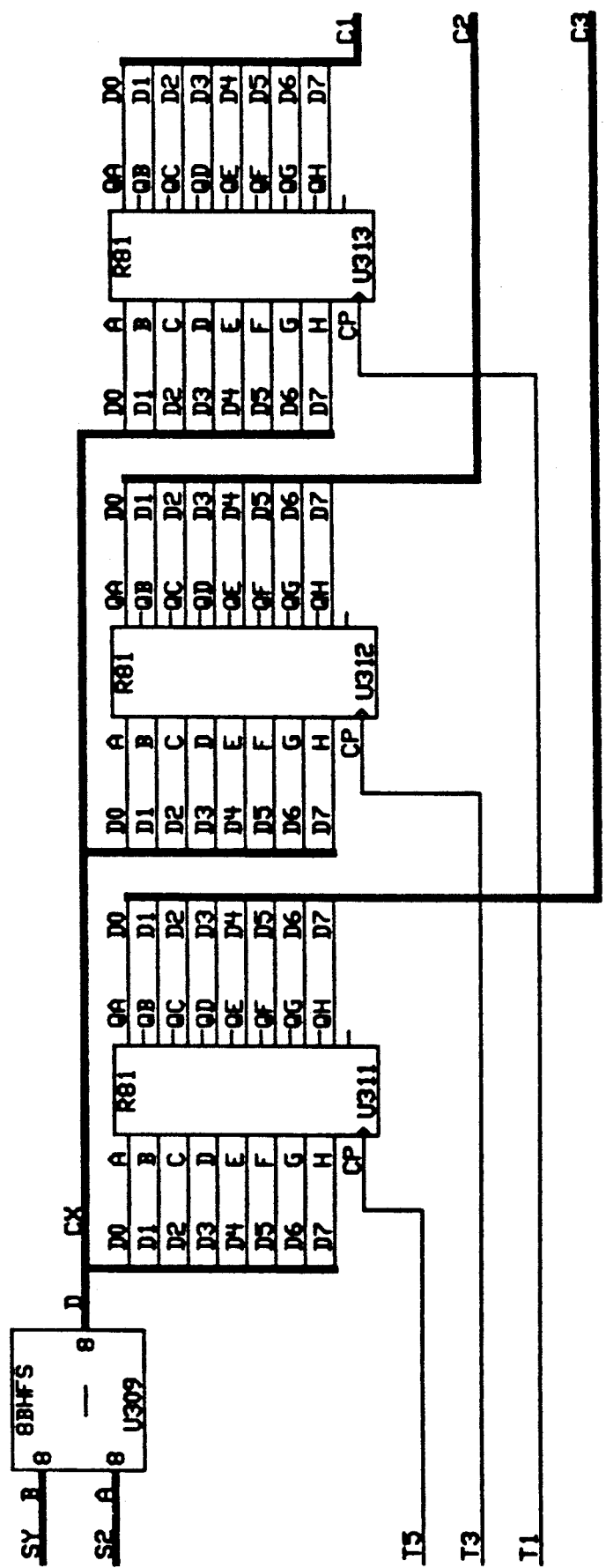

Referring now to FIG. 13 there is shown a schematic diagram of the demodulation stage of the digital chroma remodulators. The composite video serial sample stream enters the circuit as an 8-bit data bus DIN at the upper left corner of FIG. 13. Individual samples in the stream are separated by registers U301 and U303 such that for any given sample $S_t$ which appears on the bus DIN, register U301 contains sample $S_{t-1}$ and register U303 contains sample $S_{t-2}$. The samples are clocked into these registers by signal TC which represents signal CTC on FIG. 12 for the first digital chroma remodulator 10 and signal HTC o FIG. 12 for the second digital chroma remodulator 12. U302 and U303 are 8-bit adders connected in series such that the output of adder U303, in conjunction with EXCLUSIVE OR gate U305 and AND gate U306, form the 10-bit data bus S123, and is the sum of the samples $S_t$, $S_{t-1}$ and $S_{t-2}$. This sum represents the sum of all samples in a complete cycle of the original (chroma or horizontal) reference signal. The sample sum S123 is divided by 3 in U307 to produce the 8-bit quotient SY representing luma-only sample coefficients correlated in time to sample $S_{t-1}$. U309 subtracts SY from sample $S_{t-1}$ to produce the 8-bit difference CX representing the chroma only sample coefficients, also correlated in time to sample $S_{t-1}$. Timing signals T1, T3 and T5 which represents signals CT1, CT3, and CT5 on FIG. 12 for the first digital chroma remodulator 10 and signals HT1, HT3 and HT5 on FIG. 12 for the second digital chroma remodulator 12, are used to capture the chroma only coefficients in three different registers U311, U312 and U313 based on which reference phase the sample relates to. In this embodiment, U313 captures the chroma sample which relates to the zero degree phase, U312 captures the chroma sample which relates to the 120 degree phase, and U311 captures the chroma sample which relates to the 240 degree phase. SY is delayed in registers U308 and U310 to produce the 8-bit data bus YAVG, time correlated with the prior chroma sample register capture. This delay provides a condition whereby, for any luma sample $Y_t$ at YAVG, the chroma samples $C_{t-1}$, $C_t$, and $C_{t+1}$ are available in registers U311, U312, and U313 and therefor on buses C1, C2 and C3 respectively. The algebraic effect of this demodulator circuitry is to implement the formulae:

$$St(luma) = (St\text{-}x.. + St.. + St+x)/N \qquad (Eq.\ 2)$$

$$St(chroma) = St - St(luma) \qquad (Eq.\ 3)$$

where:

N = Number of samples per reference cycle

X = (N−1)/2

Figure 14A:
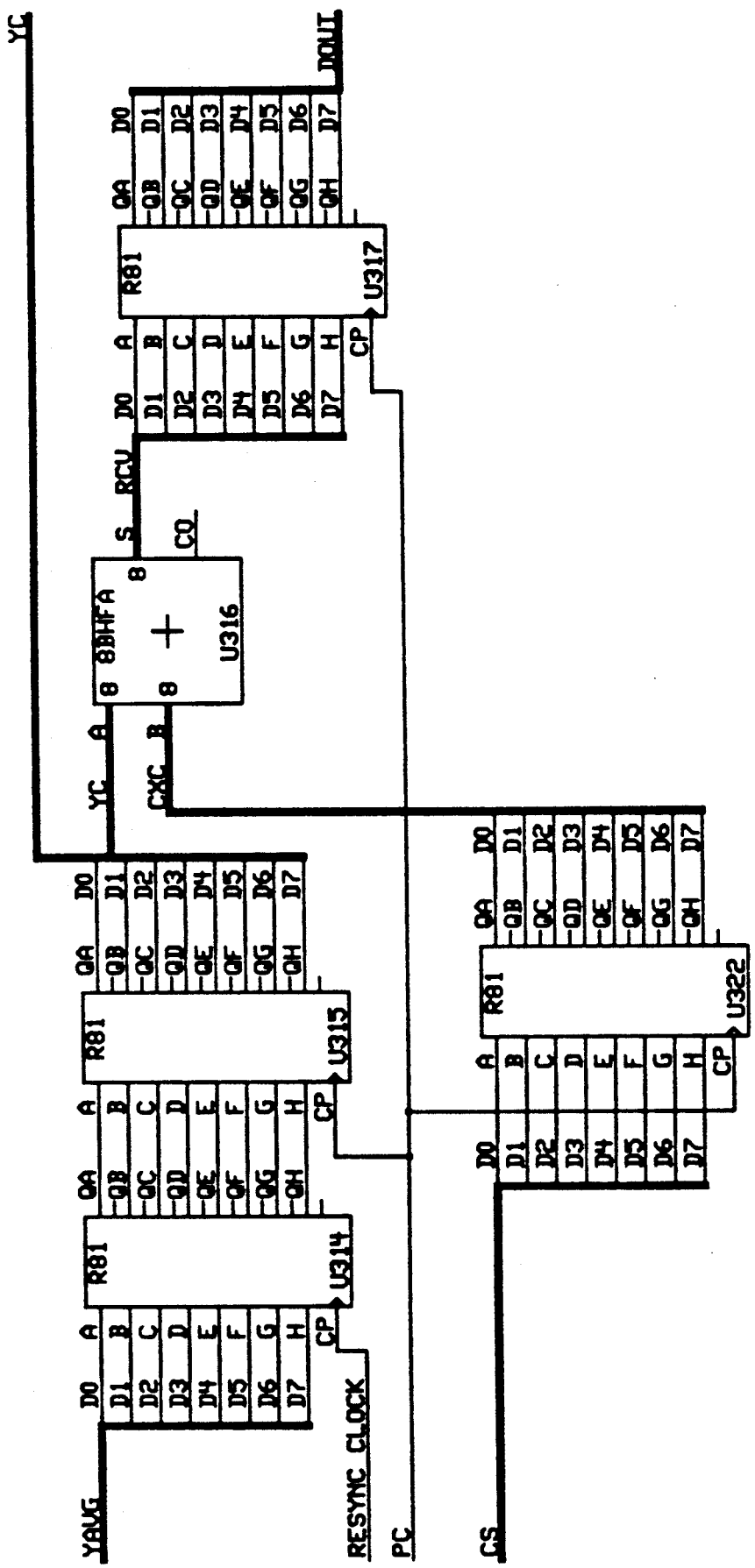
FIGS. 14a-14b are a schematic diagrams illustrating the circuitry of remodulation stage of the digital chroma remodulators according to the present invention.
Figure 14B:
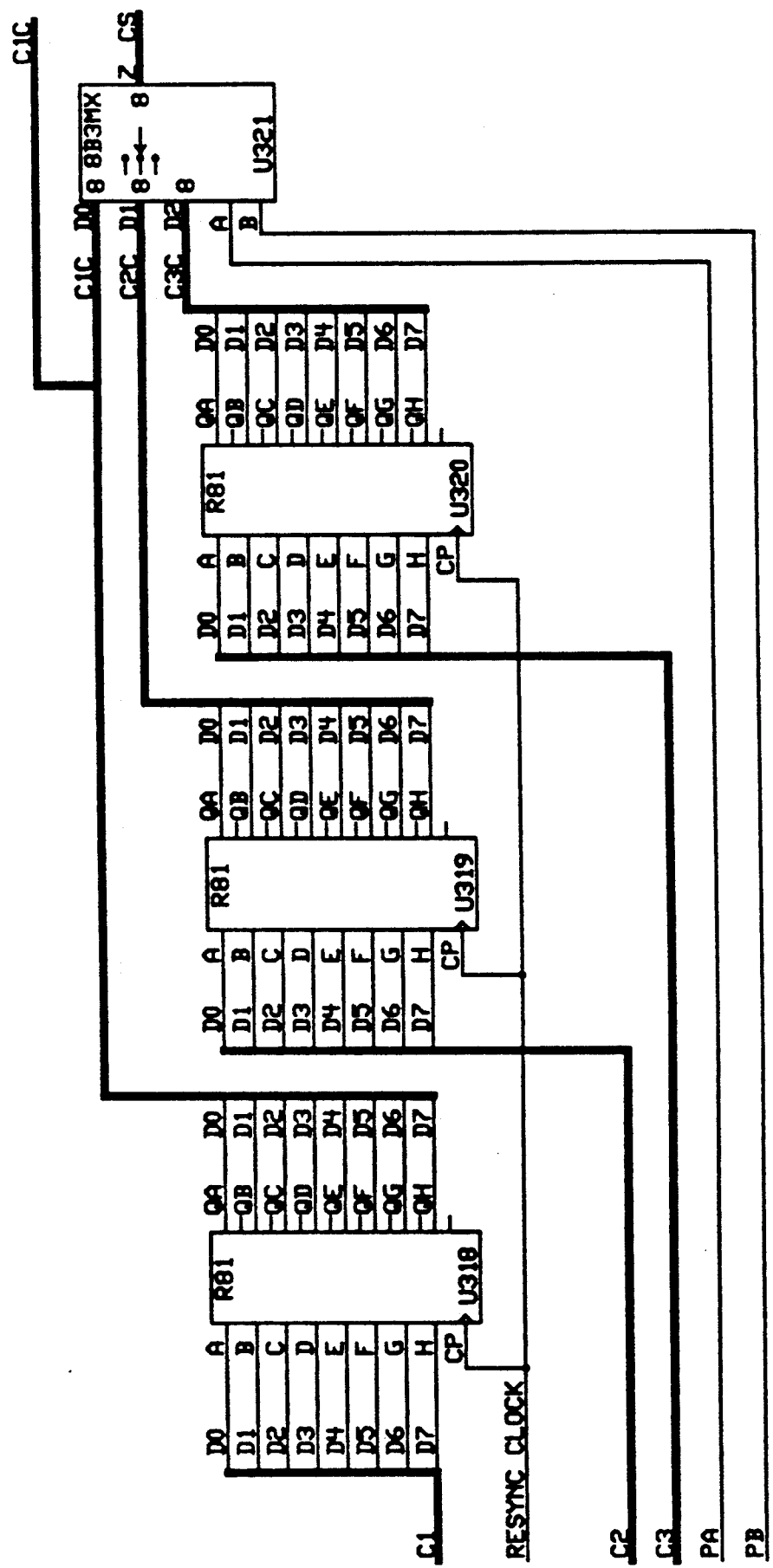

Referring now to FIG. 14, there is shown a schematic diagram of the remodulation stage of the digital chroma remodulators. Just prior to the remodulation process, the samples YAVG, C1, C2 and C3 which were captured using clock signal TC in registers U310, U313, U312 and U311 respectively, are recaptured using RESYNC CLOCK in registers U314, U318, U319 and U320 respectively. RESYNC CLOCK is a clock signal as shown in FIG. 12, whose sampling edge is positioned as a function of the instantaneous phase relationship between TC and clock signal PC which represents signal HPC on FIG. 12 for the first digital chroma remodulator 10 and signal CPC in the graph of FIG. 12 for the second digital chroma remodulator 12. The purpose of recapturing YAVG, C1, C2 and C3, which are logically correspondent to the phase timing of TC, is to isolate their physical sample timing from the physical phase timing of TC, preparatory to physically realigning them with PC. This physical realignment occurs when PC is used to capture the output of U314 in U315 yielding data bus YC, and the output of either U318, U319 or U320 in U322 yielding data bus CXC, which register output being determined by data multiplexer U321 based on the current phase of PC as reflected by signals PA and PB. It is necessary in the digital environment to provide the intermediate physical phase timing resulting from RESYNC CLOCK because TC and PC are derived from separate analog oscillators 15 and 16, and may assume any arbitrary instantaneous phase relationship, including plus or minus a few nanoseconds. Such close but not matching phase alignment may result in data setup and hold time violations with respect to the digital registers and data integrity could be lost if signal PC were used directly to capture data previously captured by signal TC. The varying phase relationship between signals TC and PC results from their operating at different frequencies as they track the chroma reference and horizontal scan frequencies. If signal TC operates at a higher frequency than signal PC then some samples captured by signal TC will not be captured by signal PC as the phase alignment shifts through 360 degrees. Similarly, if TC operates at a lower frequency than signal PC then some samples captured by signal TC will be captured twice by signal PC as the phase alignment shifts back through zero degrees.

Having realigned the luma samples YC and having chosen and realigned the phase appropriate chroma samples CXC, the two are recombined by 8-bit adder U316 to form the remodulated composite video sample stream RCV. RCV is captured using PC in register U317 to form the final 8-bit data bus DOUT. This last capture removes any time skew which may result from signal propagation delays within adder U316.

Figure 15:
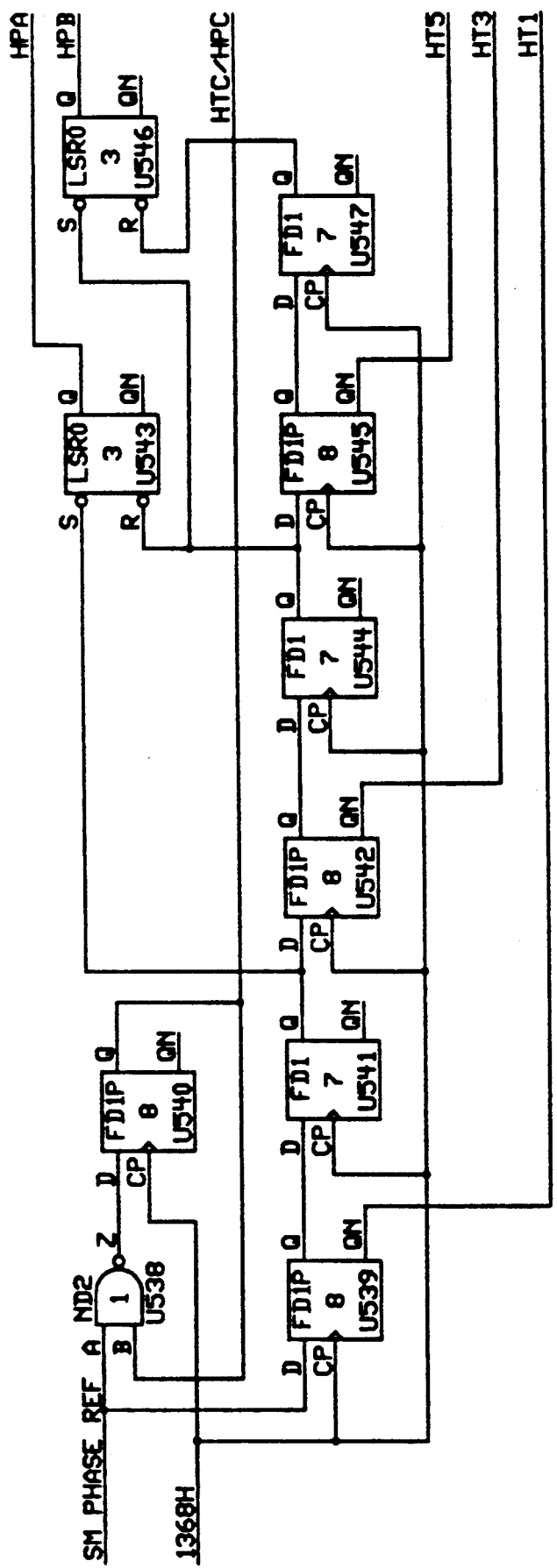
FIGS. 15 and 16 are schematic diagrams of the digital control logic according to the present invention.
Figure 16:
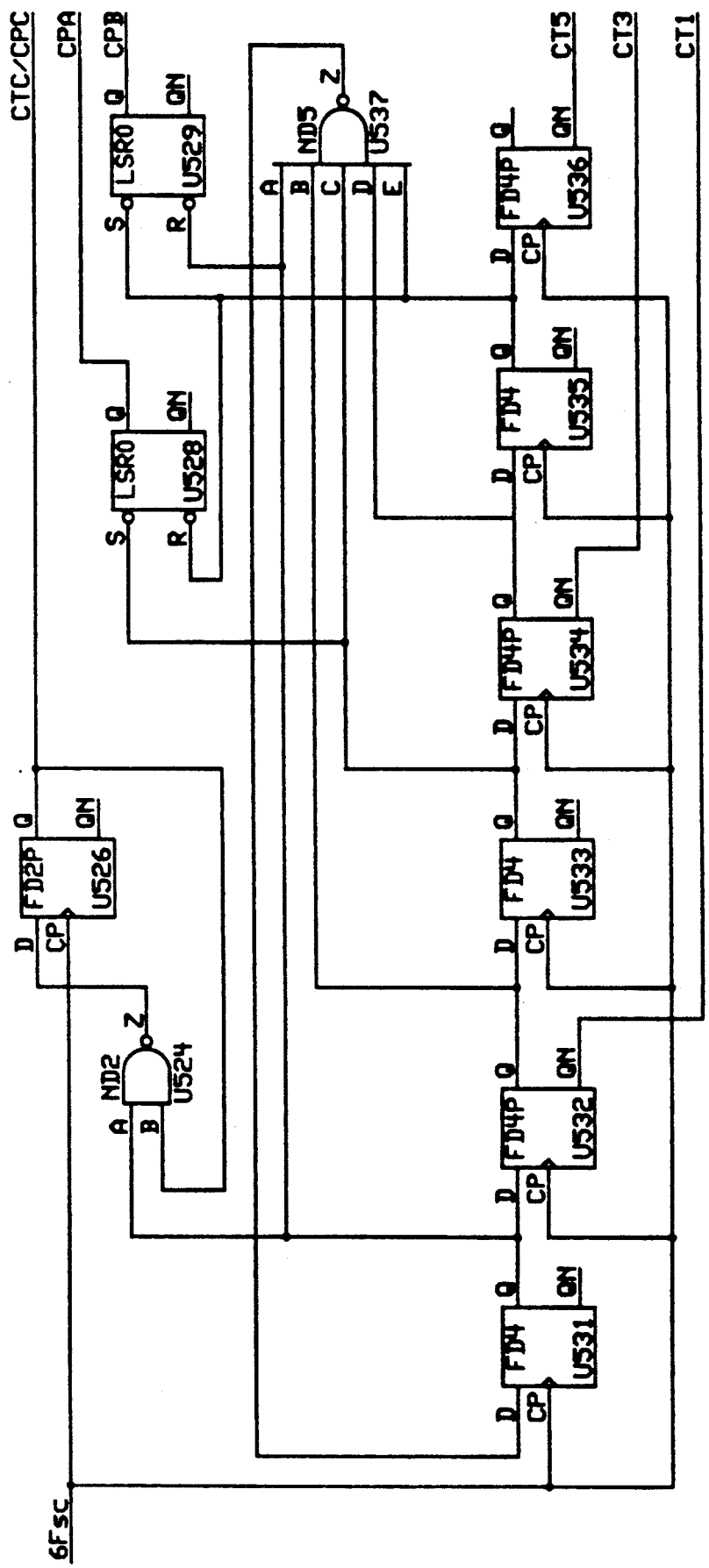

Referring now to FIGS. 15 and 16, there are shown schematic diagrams of the portions of the digital control logic 14 for creating signals HPA, HPB, HTC, HPC, HT1, HT3 and HT5 as shown in FIG. 12 from signal 1368H phase locked by external signal SM PHASE REF, and for creating signals CPA, CPB, CTC, CPC, CT1, CT3 and CT5 as shown in FIG. 12 from signal 6 Fsc.

Figure 17A:
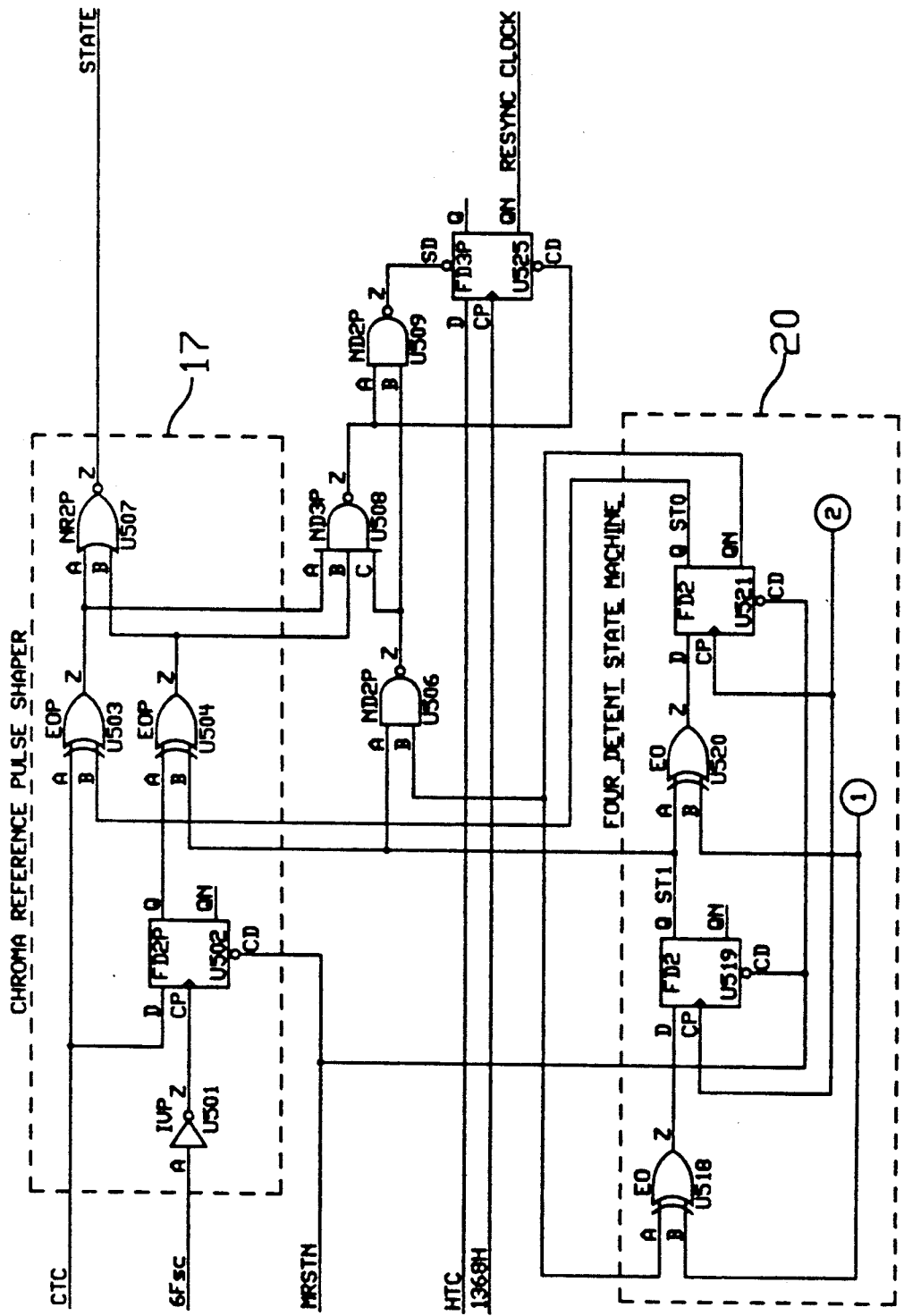
Figure 17B:
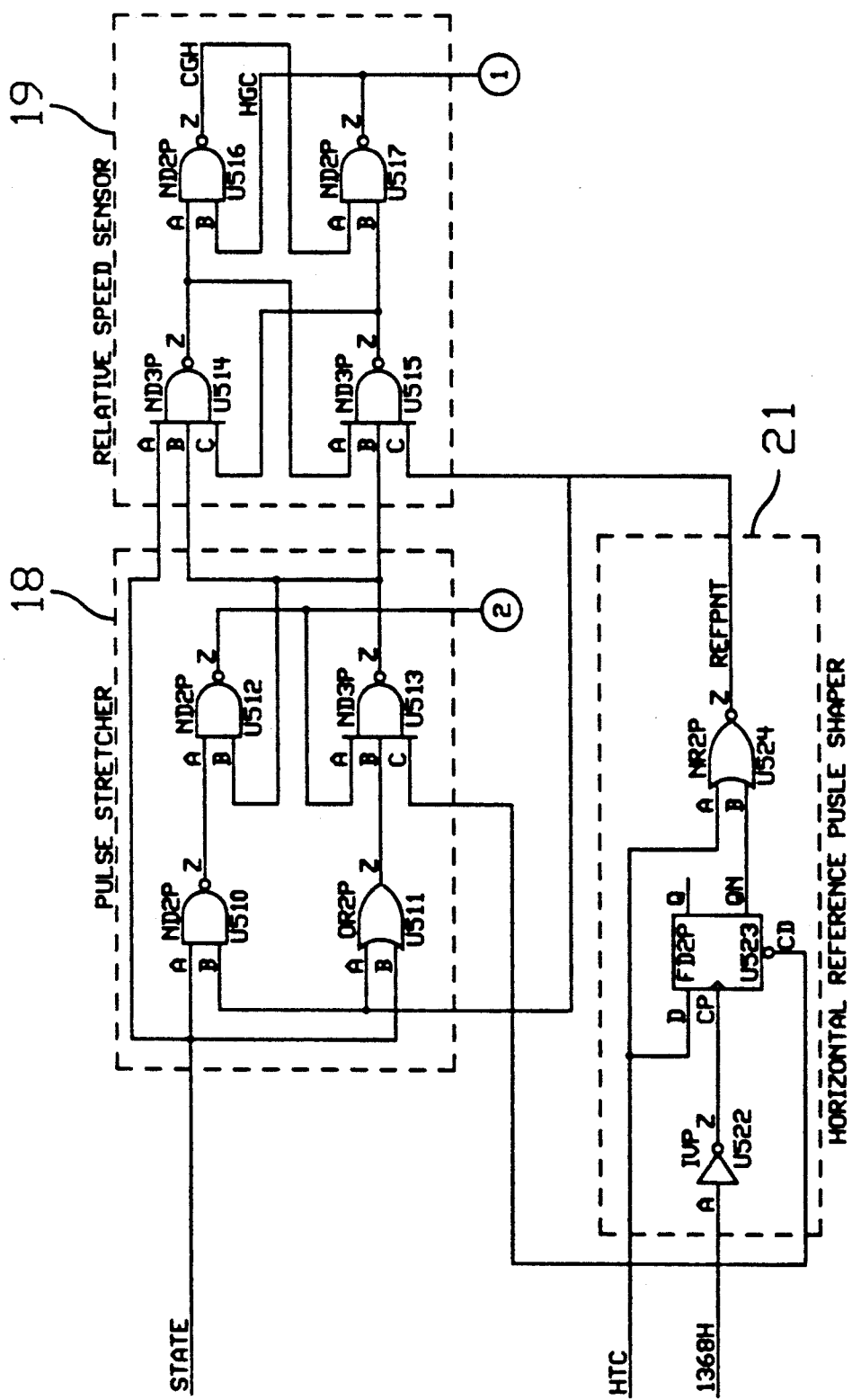
Figure 17C:
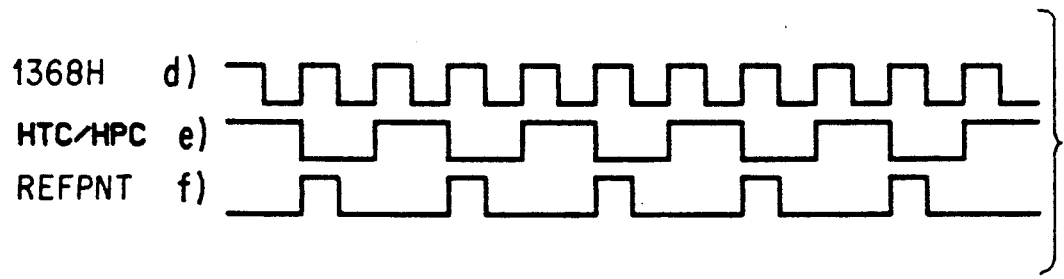
Figure 17G:
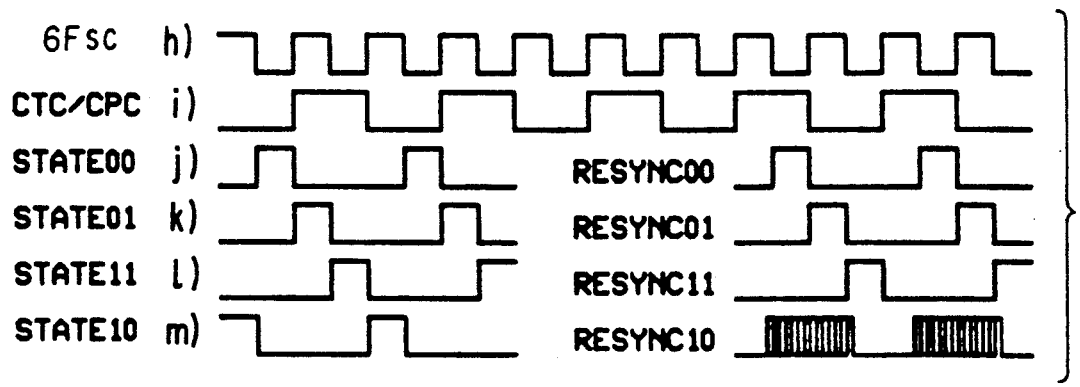

FIG. 17(a) is a schematic diagram of a portion of the digital control logic 14 which is a circuit for creating signal RESYNC CLOCK from the chroma reference 6 Fsc, the horizontal reference 1368H, and derivative signals CTC and HTC. Signal MRSTN is a short negative going pulse used to initialize the circuit. U522, U523 and U524 comprise a horizontal reference pulse shaper 21 which creates signal REFPNT from signals 1368H and CT in the phase relationship shown in the inset timing diagram. U518, U519, U520 and U521 comprise a four detent state machine 20 whose current state is held in flip/flops U519 and U521 and defined by signals ST1 and ST0 with initializing signal MRSTN setting the initial state to 00. The states advance or retard according to the common input to U518 and U520, signal HGC from relative speed sensor 19. The states advance or retard in "grey-code" sequence 00 01 11 10 or 00 10 11 01 respectively. U501, U502, U503, U504 and U507 comprise a chroma reference pulse shaper 17 which creates signal STATE from signals 6 Fsc, CTC, ST1 and ST0 in a phase relationship which is a function of the current state held in flip/flops U519 and U521 as shown in the inset timing diagram as STATE00, STATE01, STATE11 and STATE10. That state is also used in conjunction with U506, U508, U509 and U525 to create signal RESYNC CLOCK in the phase relationship shown in the inset timing diagram as RESYNC00, RESYNC01, RESYNC11 and RESYNC10. The phase relationship of RESYNC CLOCK during state 10 is essentially that of HTC and therefore the timing diagram for RESYNC10 shows the many possible phase relationships of HTC to CTC during state 10.

U510, U511, U512 and U513 comprise a pulse stretcher 18. AND gate U510 is a coincidence detector which detects any logic "1" timing coincidence between signals REFPNT and STATE and sets a flip/flop consisting of U512 U513. U514, U515, U516 and U517 comprise a relative speed sensor 19 which determines whether the coincidence was caused by CTC operating at a higher frequency than HTC (signal CGH at logic "1") or the other way around (signal HGC at logic "1"), based on whether signal REFPNT or STATE occurred at logic "1" first. That determination is latched in flip/flop U516 U517 prior to the coincidence. The detection of the coincidence implies that CTC and HTC have entered a new phase quadrature relationship and a new RESYNC CLOCK phasing is required. Capturing the coincidence in flip/flop U512 U513 causes flip/flops U519 and U521 to be clocked and thus causes the state machine to advance or retard by one state, causing in turn a new phase relationship for signal RESYNC CLOCK. Flop/flop U512 U513 remains set until both REFPNT and STATE are at logic "0" again at which time OR gate U511 resets the flip/flop.

Figure 18A:
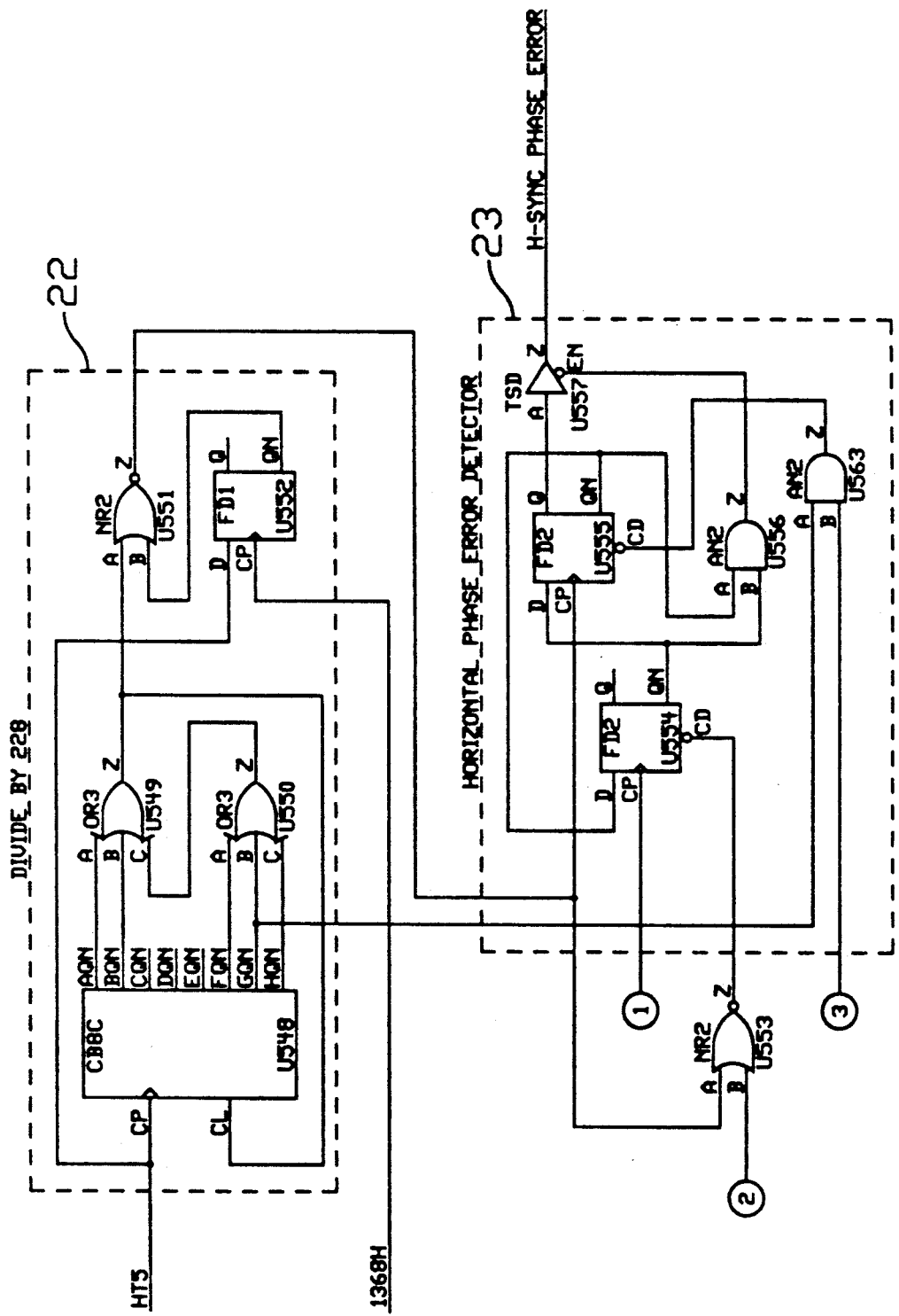
FIGS. 18a-18c are a schematic diagrams of digital control logic for producing feedback signals to operate the horizontal phase-locked oscillator and chroma subcarrier regenerator.
Figure 18B:
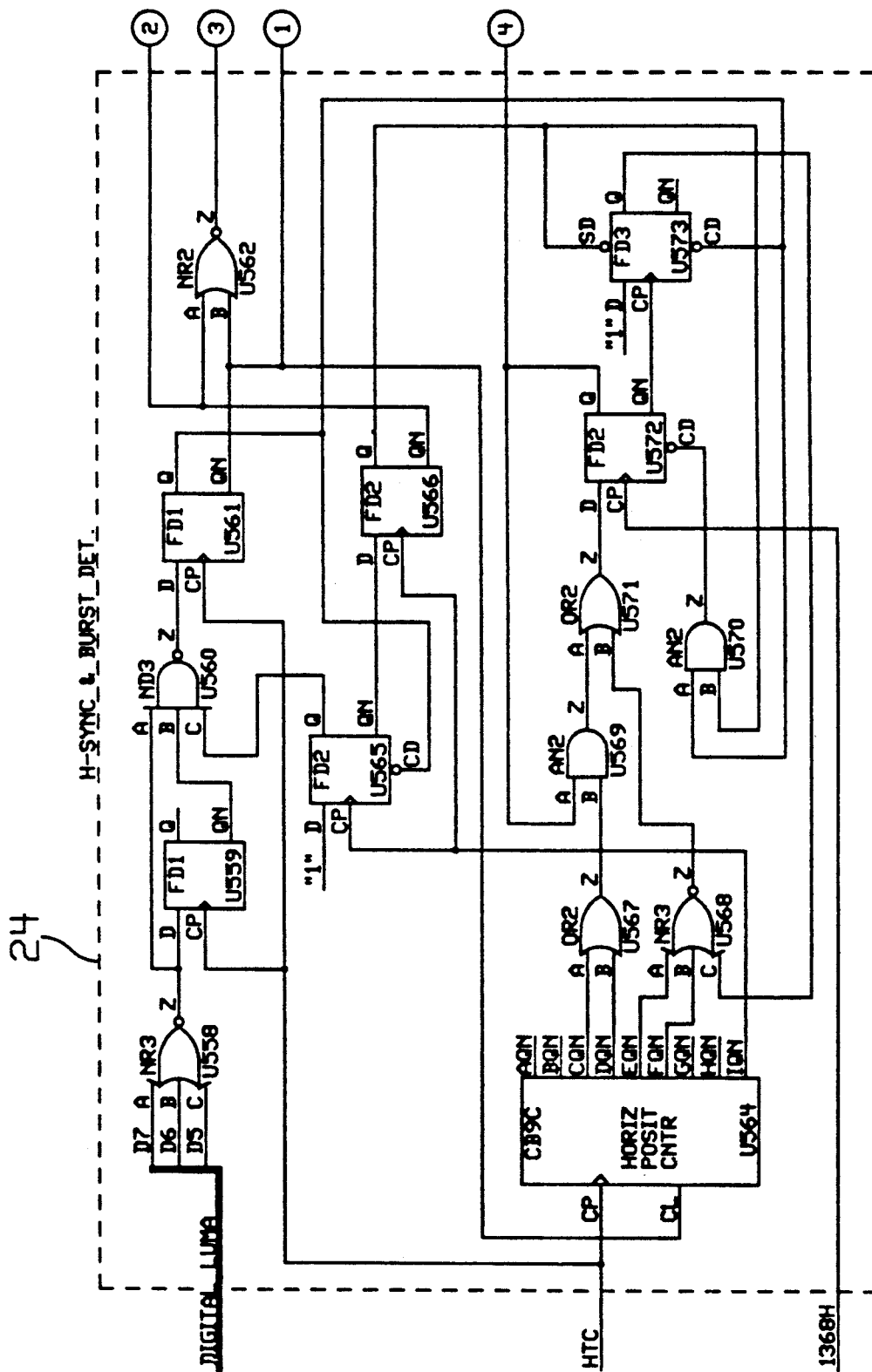
Figure 18C:
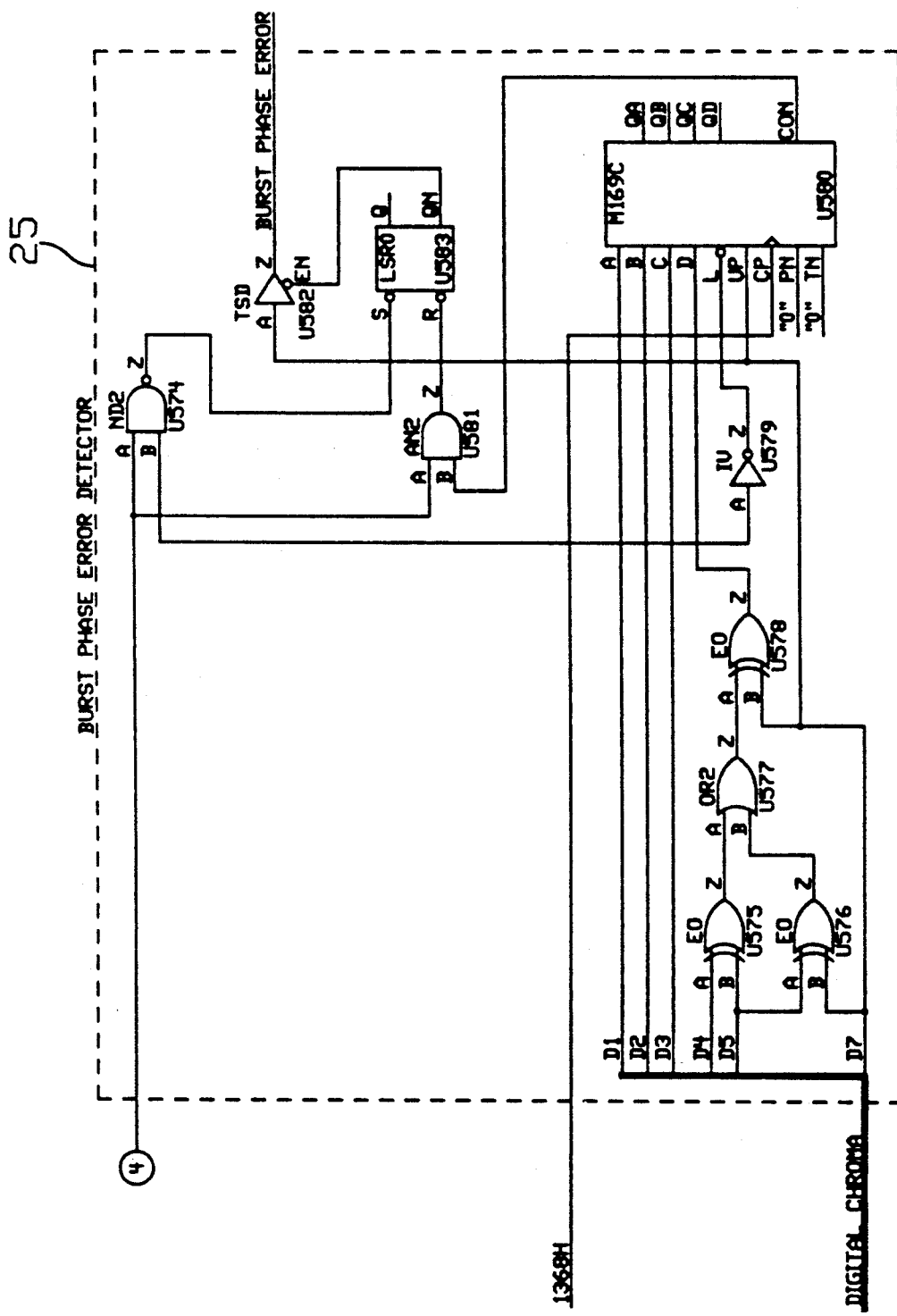

Referring now to FIG. 18, there is shown a portion of the digital control logic 14 for creating signals H-SYNC PHASE ERROR and BURST PHASE ERROR which provide the error feedback signals to the horizontal phase-locked oscillator 16 and chroma subcarrier regenerator 15 respectively. This circuitry uses data buses DIGITAL LUMA and DIGITAL CHROMA which are the data buses YC and CIC of FIG. 14 respectively, of the first digital chroma remodulator 10 as shown in FIG. 11. A horizontal synchronization and burst detector block 24 synchronizes itself to the incoming video luma sample stream DIGITAL LUMA, locating the samples which contain horizontal sync and color burst (burst gate). NOR gate U558 senses luma samples whose level is below 32, implying that a horizontal synchronizing or equalization pulse is present. Flip/flop U559 in conjunction with NAND gate U560 detects the sample which contains the falling edge of said pulse which is captured in flip/flop U561. The C input to U560 prevents further pulse edge detection prior to at least 256 additional cycles of signal HTC occurring as counted by 8-bit negative counter U564, effectively filtering out intermediate equalization pulses. A total of 684 cycles are expected per scan line. If more than 1,024 cycles occur before another horizontal synchronization pulse falling edge is detected, it is assumed that no video signal is present, which assumption is captured in flip/flop U566 where, through NOR gates U553 and U562 it blocks operation of the horizontal phase error detector 23 to prevent false generation of signal H-SYNC PHASE ERROR under no video signal conditions. Block 22 divides signal HT5 by 228 to produce a pulse at a rate of exactly one every horizontal scan line, if the horizontal phase-locked oscillator 16 is producing signal 1368H at a frequency of exactly 1,368 cycles per horizontal scan line. The horizontal phase error detector block 23 compares the HT5 divided by 228 pulse signal from U551 with the scan line rate of the actual incoming video luma sample stream horizontal sync timing from U561 and produces a pulse-width modulated H-SYNC PHASE ERROR signal proportional to the difference. Flip/flops U554 and U555 are connected in such a way that U554 is set if horizontal synchronization pulse occurs prior to the divide by 228 pulse and U555 is set if the divide by 228 pulse occurs first. Both U554 and U555 are cleared when the other, latter pulse occurs. The output of AND gate U556 is at logic "0" while one of the flip/flops U554 or U555 is set, that duration thus being directly proportional to the phase difference between the two pulses. That logic "0" enables tri-state driver U557 which outputs U555 as signal H-SYNC PHASE ERROR for said duration, that signal being at logic "1" if the divide by 228 pulse occurs first and at logic "0" if it does not. The goal of the H-SYNC PHASE ERROR signal is to adjust the horizontal phase-locked oscillator 16 output 1368H phase and frequency, once per scan line, such that it is precisely 1,368 times the current scan line frequency.

A burst phase error detector block 25 compares every third DIGITAL CHROMA sample value within the burst gate time window to zero, and creates a pulse-width modulated BURST PHASE ERROR signal which is proportional to the deviation of the sample from zero. Gates U567, U568, U569 and U571 decode the bit outputs of negative horizontal position counter U564 and, in conjunction with AND gate U570 and flip/flops U572 and U573 create a signal at the Q output of U572 which corresponds in scan line timing with the burst gate surrounding the chroma reference samples within the video signal. Up/down counter U580 is a standard 4-bit counter of the 74HC169 type which is preset by signal HT5 with a value at inputs A, B, C and D which represents the difference between the DIGITAL CHROMA sample value and zero. DIGITAL CHROMA sample bits 1, 2 and 3 are preset directly into inputs A, B and C of U580 while gates U575, U576, U577 and U578 aggregate the effect of DIGITAL CHROMA sample bits 4 and 5 into input D of U580. DIGITAL CHROMA sample bit 7 is used as the sign of the value and is used to control the direction of U580 count such that it is an up count if the sample is negative and a down count if the sample is positive. The net effect is to count the preset value toward zero at which point U580 produces a logic "0" at output CON. Each occurrence of logic "1" at signal HT5 during burst gate causes NAND gate U574 to produce a logic "0" which sets latch U583. Either the CON output of U580 or the end of burst gate causes AND gate U581 to reset latch U583. The output of U583 at QN, therefore is a logic "0" for a duration which is directly proportional to the difference between the value of the DIGITAL CHROMA sample while signal HT5 is at logic "1" and the value zero. This output enables tri-state driver U582 which outputs the sign of the sample value as signal BURST PHASE ERROR for said duration. The goal of this signal is to adjust the chroma subcarrier regenerator 15 output frequency 6 Fsc, once per chroma reference cycle within the burst gate time period of every scan line, such that is precisely 6 times the original chroma reference frequency. For operation with PAL format composite video signals, the logic level of the BURST PHASE ERROR signal must be reversed with every other scan line in accordance with the PAL standard.

I claim:

1. Apparatus for spatial manipulation of a standard composite color video display signal comprising:
   separator means coupled to said standard composite color video display signal for separating said standard composite color video display signal into its constituent luminance component signal and chrominance component signal;
   demodulator means coupled to said chrominance component signal for demodulating said chrominance component signal into a signal form which is not based on said chroma reference signal phase;
   remodulator means coupled to said chrominance component signal for modulating said chrominance component on a horizontally referenced subcarrier signal which is modulated in phase in response to color hue and in amplitude in response to color saturation;
   summing means coupled to said modulated horizontally referenced subcarrier signal and said luminance signal for summing said modulated subcarrier with said luminance component to form a symmetrical composite color video display signal; and
   image manipulation means coupled to said symmetrical composite color video display signal for sampling said symmetrical composite color video to produce a first set of image data values, and for selectively reordering said first set of image data values and producing, therefrom, a spatially manipulated symmetrical composite color video signal.

2. The apparatus of claim 1 wherein the image manipulation means comprises an addressable storage means coupled to said first set of image data values for selectively reordering said first set of image data values.

3. The apparats of claim 1 further comprising:
   second separator means coupled to said spatially manipulated symmetrical composite color video signal for separating said spatially manipulated symmetrical composite color video display signal into its constituent manipulated luminance component signal and manipulated chrominance component signal;
   second demodulator means coupled to said second separator means for demodulating said manipulated chrominance component signal into a signal form which is not based on said horizontally referenced subcarrier signal;
   second remodulator means coupled to said second demodulator means for modulating said demodulated manipulated chrominance component signal on a chroma referenced subcarrier signal which is modulated in phase in response to color hue and in amplitude in response to color saturation; and
   second summing means coupled to said second remodulator means and said second separator means for summing said modulated chroma referenced subcarrier with said manipulated luminance component to form a manipulated standard composite color video display signal.

4. The method for spatially manipulating a standard composite color television signal comprising the steps of:

separating said standard composite color video display signal into its constituent luminance component signal and chrominance component signal;

demodulating said chrominance component signal into a signal form which is not based on said chroma reference signal phase;

modulating said chrominance component on a horizontally referenced subcarrier signal which is modulated in phase in response to color hue and in amplitude in response to color saturation;

summing said modulated subcarrier with said luminance component to form a symmetrical composite color video display signal;

sampling said symmetrical composite color video display signal for producing image data values in an original order representing said symmetrical composite color video display signal at an instant in time; and selectively reordering said image data values and producing, therefrom, a spatially manipulated symmetrical composite color video signal.

5. The method of claim 4 further comprising the steps of:

separating said spatially manipulated symmetrical composite color video signal into its constituent manipulated luminance component signal and manipulated chrominance component signal;

demodulating said manipulated chrominance component signal into a signal form which is not based on said horizontally referenced subcarrier signal;

modulating said demodulated manipulated chrominance component signal on a chroma referenced subcarrier signal which is modulated in phase in response to color hue and in amplitude in response to color saturation; and summing said modulated chroma referenced subcarrier with said manipulated luminance component to form a manipulated standard composite color video display signal.

* * * * *